United States Patent
Xin et al.

(10) Patent No.: US 7,933,355 B2
(45) Date of Patent: Apr. 26, 2011

(54) SYSTEMS, DEVICES, AND METHODS FOR TRAINING SEQUENCE, TRANSMISSION AND RECEPTION

(75) Inventors: Yan Xin, Kanata (CA); Huan Wu, Kanata (CA); Shouxing Qu, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 28 days.

(21) Appl. No.: 12/542,995

(22) Filed: Aug. 18, 2009

(65) Prior Publication Data

US 2010/0040166 A1    Feb. 18, 2010

Related U.S. Application Data

(60) Provisional application No. 61/089,712, filed on Aug. 18, 2008.

(51) Int. Cl.
*H04L 27/00* (2006.01)
(52) U.S. Cl. ......................................................... 375/295
(58) Field of Classification Search .................. 375/130, 375/260, 295, 343, 367
See application file for complete search history.

(56) References Cited

U.S. PATENT DOCUMENTS

| | | | |
|---|---|---|---|
| 6,731,689 B2 | 5/2004 | Dogan | |
| 7,012,906 B1 | 3/2006 | Song | |
| 7,079,567 B2 | 7/2006 | van Nee | |
| 7,173,899 B1 | 2/2007 | Rupp | |
| 7,376,115 B2 | 5/2008 | Tang et al. | |
| 7,555,053 B2 | 6/2009 | Trachewsky et al. | |
| 2005/0276338 A1 | 12/2005 | Chow | |
| 2006/0018400 A1 | 1/2006 | Touchais | |
| 2008/0002566 A1 | 1/2008 | Zhang | |
| 2008/0170560 A1* | 7/2008 | Im et al. | 370/350 |
| 2008/0232515 A1 | 9/2008 | Xin | |
| 2009/0060076 A1* | 3/2009 | Ma et al. | 375/260 |
| 2010/0173643 A1* | 7/2010 | Beale et al. | 455/452.1 |

FOREIGN PATENT DOCUMENTS

| | | |
|---|---|---|
| CA | 2284970 | 10/1998 |
| EP | 1292080 | 4/2005 |
| GB | 2425024 | 5/2007 |
| WO | 2009036389 A2 | 3/2009 |

OTHER PUBLICATIONS

TS 45.002, "Geran: Multiplexing and multiple access on the radio path", 2008.
GP-072033, "WID: Multi-User Reusing-One-Slot (MUROS)", source: China Mobile, Ericsson, Nokia Siemens Networks, Nokia, Nortel Networks, NXP, Qualcomm, Telecom Italia, Vodafone, Nov. 12-16, 2007.
GP-070214, GP-071792, "Voice capacity evolution with orthogonal sub channel", source: Nokia Siemens Network and Nokia, Feb. 12-16, 2007.
GP-071738, "Speech capacity enhancements using DARP", source: Qualcomm, Nov. 12-16, 2007.

(Continued)

*Primary Examiner* — Don N Vo
(74) *Attorney, Agent, or Firm* — Finnegan, Henderson, Farabow, Garrett & Dunner LLP

(57) ABSTRACT

A training sequence helps optimize SNR degradation in a wireless communication. Various sets of training sequences may be stored in a repository, and transmitters and receivers encoded with such sequences transmit at least one of the sequences between them as part of the wireless transmission of data.

33 Claims, 14 Drawing Sheets

| TSC# | TSCs |
|---|---|
| 0 | 0 1 1 0 0 0 1 0 0 0 1 0 0 1 0 0 1 1 1 1 0 1 0 1 1 1 |
| 1 | 0 1 0 1 1 1 1 0 1 0 0 1 1 0 1 1 1 0 1 1 1 0 0 0 0 1 |
| 2 | 0 1 0 0 0 0 0 1 0 1 1 0 0 0 1 1 1 0 1 1 1 0 1 1 0 0 |
| 3 | 0 0 1 0 1 1 0 1 1 1 0 1 1 1 0 0 1 1 1 1 0 1 0 0 0 0 |
| 4 | 0 1 1 1 0 1 0 0 1 1 1 1 0 1 0 0 1 1 1 0 1 1 1 1 1 0 |
| 5 | 0 1 0 0 0 0 0 1 0 0 1 1 0 1 0 1 0 0 1 1 1 1 0 0 1 1 |
| 6 | 0 0 0 1 0 0 0 0 0 1 1 0 1 0 0 0 0 1 1 0 1 1 1 0 1 0 1 |
| 7 | 0 1 0 0 0 1 0 1 1 1 1 0 0 1 1 1 1 1 1 0 0 1 0 1 0 0 1 |

OTHER PUBLICATIONS

GP-080658, "Draft TR on Circuit Switched Voice Capacity Evolution for GERAN (v.0.0.5)", source: WI Rapporteur, May 12-16, 2008.

B. Steiner and P. Jung, "Optimum and suboptimum channel estimation for the uplink CDMA mobile radio systems with joint detection", European Transactions on Telecommunications, vol. 5, Jan.-Feb. 1994, pp. 39-50.

M. Pukkila and P. Ranta, "Channel estimator for multiple co-channel demodulation in TADM mobile systems", Proc. of the 2nd EPMC, Germany, 1997.

Research in Motion Ltd., "On Training Sequences for MUROS", Document No. GP-081053, 3GPP TSG GERAN #39, Florence, Italy, Aug. 25-29, 2008 [Retrieved on Oct. 26, 2009]. Retrieved from the Internet: <URL: http://www.3gpp.org/ftp/tsg_geran/TSG_GERAN/GERAN_39_Florence/Docs/>.

Chen et al., "GERAN Evolution: Multi-User Reusing One Slot to Improve Capacity", 2009 International Conference on Communications and Mobile Computing, IEEE, vol. 1, pp. 219-223, Jan. 6-8, 2009 (Aug. 1, 2009).

Nokia, "Voice Capacity Evolution with Orthogonal Sub Channel", Document No. GP-070214, 3GPP TSG GERAN #33, Seoul, South Korea, Feb. 12-16, 2007 (Feb. 16, 2007). [Retrieved on Oct. 26, 2009]. Retrieved from the Internet: <URL: http://www.3gpp.org/ftp/tsg_geran/tsg_geran/GERAN_33_Seoul/Docs/>.

Motorola, "MUROS Intra-Cell Interference and TSC Design", Document No. GP-080602, 3GPP TSG GERAN #38, Malaga, Spain, May 12-16, 2008 (May 16, 2008). [Retrieved on Oct. 26, 2009. Retrieved from the Internet: <URL:http://www.3gpp.org/ftp/tsg_geran/tsg_geran/GERAN_38_Malaga/Docs/>.

China Mobile, "New Series of Training Sequence Codes for MUROS", Document No. GP-080641, 3GPP TSG GERAN #38, Malaga, Spain, May 12-16, 2008 (May 16, 2008). [Retrieved on Oct. 26, 2009]. Retrieved from the Internet: <URL:http//www.3gpp.org/ftp/tsg_geran/tgs_geran/GERAN_38_Malaga/Docs/>.

Chen et al., "A Scheme of Multi-User reusing One Soot on Enhancing Capacity of GSM/EDGE Networks", International Conference on Communication Systems, 2008 (ICCS 2008), IEEE, Nov. 19-21, 2008 (Nov. 21, 2008), pp. 1574-1578. [Retrieved on Oct. 26, 2009]. Retrieved from the Internet: <URL:http://202.194.20.8/proc/ICCS2008/papers/317.pdg>.

International Search Report, PCT/CA2009/001149, Oct. 27, 2009.

China Mobile: "New Series of Training Sequence Codes for MUROS" 3GPP Draft; GP-080785, 3rd Generation Partnership Project (3GPP), Mobile Competence Centre; 650, Route Des Lucioles; F-06921 Sophia-Antipolis Cedex; France, vol. TSG GERAN, No. Malaga; 20080513, May 13, 2008, XP050020071 [retrieved on May 13, 2008].

China Mobile: "New Series of Training Sequence Codes for MUROS" 3GPP Draft; New Series of Training Sequence Codes for "MUROS"_20080506, 3rd Generation Partnership Project (3GPP), Mobile Competence Centre; 650, Route Des Lucioles; F-069271 Sophia-Antipolis Cedex; France, vol. TSG GERAN, No. Malaga; 20080507, May 7, 2008, XP050020222 [retreived on May 7, 2008].

Samsung: 3GPP Draft; GP-070620, 3rd Generation Partnership Project (3GPP), Mobile Competence Centre; 650, Route Des Lucioles; F-06921 Sophia-Antipolis Cedex; France, vol. TSG GERAN, No. Shenzhen; 20070510, May 10, 2007, XP050018040 [retrieved on May 10, 2007].

Ericsson: 3GPP Draft; GP-070707, 3rd Generation Partnership Project (3GPP), Mobile Competence Centre; 650, Route Des Lucioles; F-06921 Sophia-Antipolis Cedex; France, vol. TSG GERAN, No. Shenzhen; 20070510, May 10, 2007, XP050018121 [retrieved on May 10, 2007].

Motorola: "MUROS Intra-Cell Interference and TSC Design" 3GPP Draft; Muros TSS Design (Rev2), 3rd Generation Partnership Project (3GPP), Mobile Competence Centre; 650, Route Des Lucioles; F-06921 Sophia-Antipolis Cedex; France, vol. TSG GERAN, No. Malaga; 20080506, May 6, 2008, XP050020221 [retrieved on May 6, 2008].

Ericsson: "Adaptive Symbol Constellation for MUROS (Downlink)" 3GPP TSG GERAN No. 37, GP-080114, Telefon AB LM Ericsson; Seoul, South Korea, Feb. 18-22, 2008.

"Voice Services Over Adaptive Multi-User Channels on One Slot" 3GPP TSG GERAN No. 40, GP-081949, 3GPP Work Item Description, Agenda Item 6.1; Miami, Florida, USA, Nov. 17-21, 2008.

European Search Report dated Apr. 16, 2010 issued in corresponding application No. 09168109.8.

* cited by examiner

| TSC# | TSCs |
|---|---|
| 0 | 0 0 1 0 0 1 0 1 1 1 0 0 0 0 1 0 0 0 1 0 0 1 0 1 1 1 |
| 1 | 0 0 1 0 1 1 0 1 1 1 0 1 1 1 0 0 0 1 0 1 1 0 1 1 1 |
| 2 | 0 1 0 0 0 0 1 1 1 0 1 1 1 0 1 0 0 1 0 0 0 0 1 1 1 0 |
| 3 | 0 1 0 0 0 1 1 1 0 1 1 0 1 0 0 0 1 0 0 0 1 1 1 1 0 |
| 4 | 0 0 0 1 1 0 1 0 1 1 1 0 0 1 0 0 0 0 0 1 1 0 1 0 1 1 |
| 5 | 0 1 0 0 1 1 1 0 1 0 1 1 0 0 0 0 0 1 0 0 1 1 1 0 1 0 |
| 6 | 1 0 1 0 0 1 1 1 1 1 0 1 1 0 0 0 1 0 1 0 0 1 1 1 1 1 |
| 7 | 1 1 1 0 1 1 1 1 0 0 0 1 0 0 1 0 1 1 1 0 1 1 1 1 0 0 |

FIG. 2

| TSC# | TSCs |
|---|---|
| 0 | 0 0 1 0 1 1 0 1 1 1 0 1 1 1 0 1 0 0 0 1 1 1 1 0 1 1 |
| 1 | 0 0 0 1 0 0 0 1 1 1 1 0 1 0 0 1 0 0 1 0 0 0 1 0 0 0 |
| 2 | 0 1 1 1 0 1 0 0 1 0 0 0 0 1 0 0 0 1 0 0 0 1 1 1 1 0 |
| 3 | 0 1 0 0 0 1 0 0 0 1 1 1 0 0 0 0 1 0 1 1 0 1 1 1 0 1 |
| 4 | 0 1 0 0 0 1 0 1 1 0 0 0 0 1 0 1 1 0 0 0 1 0 0 0 0 0 |
| 5 | 0 1 0 1 1 1 1 1 0 0 1 0 0 1 1 1 0 0 1 0 1 0 0 0 0 0 |
| 6 | 0 1 1 1 0 1 1 1 1 0 0 1 0 1 1 1 1 0 0 1 0 0 0 1 0 1 |
| 7 | 0 0 1 0 1 0 1 1 0 0 1 1 1 1 1 1 0 0 1 1 1 1 0 1 0 1 |

FIG. 3

| TSC# | TSCs |
|---|---|
| 0 | 0 1 1 0 0 0 1 0 0 0 1 0 0 1 0 0 1 1 1 1 0 1 0 1 1 1 |
| 1 | 0 1 0 1 1 1 1 0 1 0 0 1 1 0 1 1 1 0 1 1 1 0 0 0 0 1 |
| 2 | 0 1 0 0 0 0 1 0 1 1 0 0 0 1 1 1 0 1 1 1 1 0 1 1 0 0 |
| 3 | 0 0 1 0 1 1 0 1 1 1 0 1 1 0 0 1 1 1 1 0 1 0 0 0 0 |
| 4 | 0 1 1 1 0 1 0 0 1 1 1 1 0 1 0 0 1 1 1 0 1 1 1 1 1 0 |
| 5 | 0 1 0 0 0 0 0 1 0 0 1 1 0 1 0 1 0 0 1 1 1 1 0 0 1 1 |
| 6 | 0 0 1 0 0 0 0 0 1 1 0 1 0 0 0 0 1 1 0 1 1 1 0 1 0 1 |
| 7 | 0 1 0 0 0 1 0 1 1 1 0 0 1 1 1 1 1 1 0 0 1 0 1 0 0 1 |

| TSC# | TSCs |
|---|---|
| 0 | 1 1 1 0 0 0 0 0 1 0 0 1 1 0 1 0 1 0 0 1 1 1 0 0 1 |
| 1 | 1 0 1 0 0 0 0 1 0 1 1 1 0 0 1 1 0 1 1 1 1 0 1 0 0 1 |
| 2 | 1 0 1 0 0 1 0 0 1 1 1 1 1 1 1 0 0 1 1 1 0 1 0 1 0 0 0 |
| 3 | 0 1 1 0 1 0 1 0 0 0 1 1 0 0 0 0 0 0 1 1 0 1 1 0 1 1 |
| 4 | 0 0 1 1 0 1 1 0 1 1 1 1 1 0 1 0 1 1 1 0 0 0 1 1 0 0 |
| 5 | 1 1 1 1 1 1 0 0 1 0 0 1 1 1 0 0 1 0 1 0 1 1 1 1 1 1 |
| 6 | 0 0 0 0 1 1 1 0 0 1 0 1 0 1 1 0 0 1 0 0 0 0 0 0 1 0 |
| 7 | 1 0 1 1 1 1 0 1 1 0 0 1 1 1 0 1 0 0 0 0 1 0 1 1 1 0 |

SYSTEMS, DEVICES, AND METHODS FOR TRAINING SEQUENCE, TRANSMISSION AND RECEPTION

RELATED APPLICATION

This application claims the benefit of prior U.S. Provisional Application No. 61/089,712 filed Aug. 18, 2008 hereby incorporated by reference in its entirety.

FIELD OF THE DISCLOSURE

The disclosure relates to systems and methods for training sequence selection, transmission and reception.

BACKGROUND

Mobile communication systems employ signal processing techniques against the impact of time variant and frequency selective mobile radio channels to improve the link performance. Equalization is used to minimize intersymbol interference (ISI) caused by multipath fading in frequency selective channels. Since the mobile radio channel is random and time varying, an equalizer needs to identify the time-varying characteristics of the mobile channel adaptively through training and tracking. Time division multiplex access (TDMA) wireless systems such as Global System for Mobile communications (GSM) transmit data in fixed-length timeslots, and a training sequence is included in the timeslot (burst), which is designed to allow the receiver to detect timing information and to obtain channel coefficients through channel estimation for further channel equalization.

GSM is a successful digital cellular technology being deployed worldwide. Currently, GSM networks provide both voice and data service for billions of subscribers and are still expanding. The access scheme of GSM is TDMA. As illustrated in FIG. 1, in the 900 MHz frequency band 100, the downlink 102 and uplink 104 are separated, and each has a 25 MHz bandwidth including 124 channels. Carrier separation is 200 kHz. A TDMA frame 106 consists of 8 timeslots 108 corresponding to one carrier frequency. The duration of a timeslot is 577 µs. For a normal burst, one GSM timeslot includes 114 data bits, 26 training sequence bits, 6 tail bits, 2 stealing bits, and 8.25 guard period bits. Currently, only one user's speech is transmitted in each timeslot.

Eight training sequences for GSM normal bursts are defined in the 3GPP specification (see TS 45.002, "GERAN: Multiplexing and multiple access on the radio path") and are widely used in practice for burst synchronization and channel estimation in current GSM/EDGE Radio Access Network (GERAN) systems.

With the increase in the number of subscribers and voice traffic, great pressure is added on GSM operators especially within countries with dense population. In addition, efficient use of hardware and spectrum resource is desired as voice service prices drop. One approach to increasing voice capacity is to multiplex more than one user on a single timeslot.

Voice services over Adaptive Multi-user channels on One Slot (VAMOS) (see GP-081949, 3GPP Work Item Description (WID): Voice services over Adaptive Multi-user channels on One Slot) (note: Multi-User Reusing-One-Slot (MUROS) (see GP-072033, "WID": Multi-User Reusing-One-Slot) is the corresponding study item)) is an ongoing work item in GERAN that seeks to increase voice capacity of the GERAN in the order of a factor of two per BTS transceiver both in the uplink and the downlink by multiplexing at least two users simultaneously on the same physical radio resource, i.e., multiple users share the same carrier frequency and the same timeslot. Orthogonal Sub Channel (OSC) (see GP-070214, GP-071792, "Voice capacity evolution with orthogonal sub channel"), co-TCH (see GP-071738, "Speech capacity enhancements using DARP") and Adaptive Symbol Constellation (see GP-080114 "Adaptive Symbol Constellation for MUROS (Downlink)") are three MUROS candidate techniques.

In the uplink of OSC, co-TCH, and Adaptive Symbol Constellation two users sharing the same timeslot employ GMSK (Gaussian minimum shift keying) modulation with different training sequences. The base station uses signal processing techniques such as diversity and/or interference cancellation to separate two users' data. Similar to the uplink, in the downlink of co-TCH, two different training sequences are used for DARP (Downlink Advanced Receiver Performance) capable mobiles to separate two users. In the downlink of OSC or Adaptive Symbol Constellation, two subchannels are mapped to the I- and Q-subchannels of a QPSK-type or Adaptive QPSK (AQPSK-type) modulation in which the ratio of I-subchannel and Q-subchannel can be adaptively controlled. Two subchannels use different training sequences as well.

FIG. 2 lists eight GSM training sequence codes of 26 bits, each of which has a cyclic sequence structure, i.e., the reference sequence of 16 bits is in the middle and 10 guard bits (5 guard bits are in each side of the reference sequence). The most significant 5 bits and least significant 5 bits of the reference sequence are copied and arranged to append to and precede the reference sequence, respectively. The guard bits can cover the time of intersymbol interference and make the training sequence resistant to time synchronization errors. Each GSM training sequence has ideal periodic autocorrelation properties for non-zero shifts within [−5, 5] when the 16-bit reference sequence is considered only.

In GP-070214, GP-071792, "Voice capacity evolution with orthogonal sub channel", a new set of eight training sequences of length 26 bits was proposed for OSC, in which each of new training sequences is optimized in cross-correlation properties with the corresponding legacy GSM training sequence. The new sequences are listed in FIG. 3. It can be observed that these new training sequences do not preserve the cyclic sequence structure as the legacy GSM training sequences.

BRIEF DESCRIPTION OF THE DRAWINGS

Embodiments of the application will now be described with reference to the attached drawings in which:

FIG. 2 is a table listing the legacy GSM training sequences;

FIG. 3 is a table containing a set of training sequences with optimized cross-correlation properties compared to the legacy GSM training sequences;

DETAILED DESCRIPTION

Figure 1:
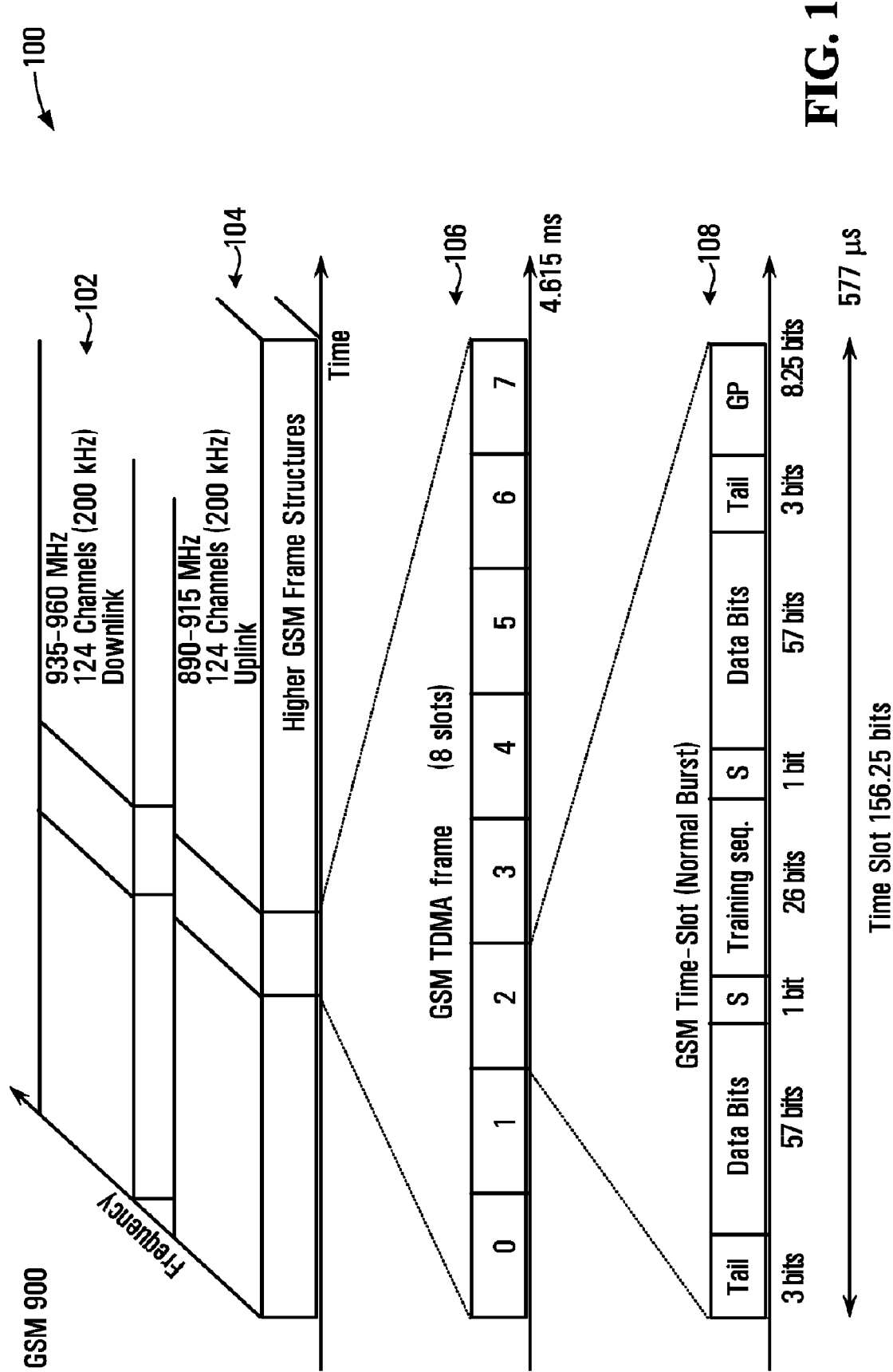
FIG. 1 is a schematic diagram of a bandwidth allocation and TDMA frame definitions for GSM.

A broad aspect of the disclosure provides a computer implemented method comprising: optimizing cross-correlations between sequences of a first training sequence set and a target training sequence set to produce a second training sequence set; optimizing cross correlations among sequences of the second training sequence set to produce a third training sequence set; optimizing cross-correlations between sequences of the third training sequence set and corresponding sequences of the target training sequence set to produce a fourth training sequence set; outputting the fourth training sequence set for use in a multi-user transmission system.

Another broad aspect of the disclosure provides a computer implemented method comprising: optimizing cross-correlations between sequences among a first training sequence set to produce a second training sequence set; optimizing cross-correlations between sequences of the second training sequence set and a target training sequence set to produce a third training sequence set; optimizing cross-correlations between sequences of the third training sequence set and corresponding sequences of the target training sequence set to produce a fourth training sequence set; and outputting the fourth training sequence set for use in a multi-user transmission system.

Another broad aspect of the disclosure provides a computer readable medium encoded with a data structure, the data structure comprising: at least one training sequence from a first set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 | |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1 | and at least one training sequence from a second set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 1 | 0 | 0 | 1 | 0 | 1 | 1 | 1 | 0 | 0 | 0 | 0 | 1 | 0 | 0 | 0 | 1 | 0 | 0 | 1 | 0 | 1 | 1 | 1 |
| 0 | 0 | 1 | 0 | 1 | 1 | 0 | 1 | 1 | 1 | 0 | 1 | 1 | 1 | 1 | 0 | 0 | 0 | 1 | 0 | 1 | 1 | 0 | 1 | 1 | 1 |
| 0 | 1 | 0 | 0 | 0 | 0 | 1 | 1 | 1 | 1 | 0 | 1 | 1 | 1 | 0 | 1 | 0 | 0 | 1 | 0 | 0 | 0 | 1 | 1 | 1 | 0 |
| 0 | 1 | 0 | 0 | 0 | 1 | 1 | 1 | 1 | 0 | 1 | 1 | 0 | 1 | 0 | 0 | 0 | 1 | 0 | 0 | 0 | 1 | 1 | 1 | 1 | 0 |
| 0 | 0 | 0 | 1 | 1 | 0 | 1 | 0 | 1 | 1 | 1 | 0 | 0 | 1 | 0 | 0 | 0 | 0 | 1 | 1 | 0 | 1 | 0 | 1 | 1 | |
| 0 | 1 | 0 | 0 | 1 | 1 | 1 | 0 | 1 | 0 | 1 | 1 | 0 | 0 | 0 | 0 | 0 | 1 | 0 | 0 | 1 | 1 | 1 | 0 | 1 | 0 |
| 1 | 0 | 1 | 0 | 0 | 1 | 1 | 1 | 1 | 1 | 0 | 1 | 1 | 0 | 0 | 0 | 0 | 1 | 0 | 1 | 0 | 0 | 1 | 1 | 1 | 1 |
| 1 | 1 | 1 | 0 | 1 | 1 | 1 | 1 | 1 | 0 | 0 | 0 | 1 | 0 | 0 | 1 | 0 | 1 | 1 | 1 | 0 | 1 | 1 | 1 | 0 | 0 |

Another broad aspect of the disclosure provides a transmitter comprising: a signal generator configured to generate a signal using a carrier frequency and time slots, with at least some time slots containing content for multiple receivers, the content for each receiver and each slot comprising at least a respective training sequence; the transmitter encoded with at least one training sequence from a first set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |

-continued

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1 |

Another broad aspect of the disclosure provides a method comprising: for a timeslot on a carrier frequency which is to contain a multi-user signal: generating a multi-user signal by combining a respective training sequence for each receiver of at least two receivers and a respective payload for each receiver, wherein the respective training sequence for at least one of the multiple receivers comprises a first training sequence from a first set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 | |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1; | and transmitting the signal.

Another broad aspect of the disclosure provides a receiver comprising: at least one antenna; wherein the receiver is encoded with at least one training sequence from a first set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 | |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1 | and the receiver is further encoded with at least one training sequence of a second set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 1 | 0 | 0 | 1 | 0 | 1 | 1 | 1 | 0 | 0 | 0 | 1 | 0 | 0 | 0 | 1 | 0 | 0 | 1 | 0 | 1 | 1 | 1 | |
| 0 | 0 | 1 | 0 | 1 | 1 | 0 | 1 | 1 | 1 | 0 | 1 | 1 | 1 | 0 | 0 | 0 | 1 | 0 | 1 | 1 | 0 | 1 | 1 | 1 | |
| 0 | 1 | 0 | 0 | 0 | 0 | 1 | 1 | 1 | 0 | 1 | 1 | 0 | 1 | 0 | 0 | 1 | 0 | 0 | 0 | 0 | 1 | 1 | 1 | 0 | |
| 0 | 1 | 0 | 0 | 0 | 1 | 1 | 1 | 1 | 0 | 1 | 1 | 0 | 1 | 0 | 0 | 0 | 1 | 0 | 0 | 0 | 1 | 1 | 1 | 1 | 0 |
| 0 | 0 | 0 | 1 | 1 | 0 | 1 | 0 | 1 | 1 | 1 | 0 | 0 | 0 | 0 | 0 | 0 | 1 | 1 | 0 | 1 | 0 | 0 | 1 | 1 | |
| 0 | 1 | 0 | 0 | 1 | 1 | 1 | 0 | 1 | 0 | 0 | 1 | 0 | 0 | 0 | 0 | 1 | 0 | 0 | 1 | 1 | 1 | 0 | 1 | 0 | |
| 1 | 0 | 1 | 0 | 0 | 1 | 1 | 1 | 1 | 0 | 1 | 1 | 0 | 0 | 0 | 0 | 1 | 0 | 1 | 0 | 0 | 1 | 1 | 1 | 1 | |
| 1 | 1 | 1 | 0 | 1 | 1 | 1 | 1 | 0 | 0 | 0 | 1 | 0 | 0 | 1 | 0 | 1 | 1 | 0 | 1 | 1 | 1 | 1 | 0 | 0 | | and further wherein the receiver is configured to operate using a training sequence selected from one of the at least one training sequence from the first set of training sequences and the at least one training sequence from the second set of training sequences.

Another broad aspect of the disclosure provides a method for a mobile device comprising: the mobile device having at least one training sequence from a first set of training sequences consisting of:

| | | | | | | | | | | | | Training Sequence | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 | 1 |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1 | the mobile device further having at least one training sequence of a second set of training sequences consisting of:

| | | | | | | | | | | | | Training Sequence | | | | | | | | | | | | | |
|---|---|---|---|---|---|---|---|---|---|---|---|---|---|---|---|---|---|---|---|---|---|---|---|---|---|
| 0 | 0 | 1 | 0 | 0 | 1 | 0 | 1 | 1 | 1 | 0 | 0 | 0 | 0 | 1 | 0 | 0 | 0 | 1 | 0 | 0 | 1 | 0 | 1 | 1 | 1 |
| 0 | 0 | 1 | 0 | 1 | 1 | 0 | 1 | 1 | 1 | 0 | 1 | 1 | 1 | 1 | 0 | 0 | 0 | 1 | 0 | 1 | 1 | 0 | 1 | 1 | 1 |
| 0 | 1 | 0 | 0 | 0 | 0 | 1 | 1 | 1 | 0 | 1 | 1 | 1 | 0 | 1 | 0 | 0 | 1 | 0 | 0 | 0 | 0 | 1 | 1 | 1 | 0 |
| 0 | 1 | 0 | 0 | 0 | 1 | 1 | 1 | 1 | 0 | 1 | 1 | 0 | 1 | 0 | 0 | 0 | 1 | 0 | 0 | 0 | 1 | 1 | 1 | 1 | 0 |
| 0 | 0 | 0 | 1 | 1 | 0 | 1 | 0 | 1 | 1 | 1 | 0 | 0 | 1 | 0 | 0 | 0 | 0 | 0 | 1 | 1 | 0 | 1 | 0 | 1 | 1 |
| 0 | 1 | 0 | 0 | 1 | 1 | 1 | 0 | 1 | 0 | 1 | 1 | 0 | 0 | 0 | 0 | 1 | 0 | 0 | 1 | 1 | 1 | 0 | 1 | 0 | 0 |
| 1 | 0 | 1 | 0 | 0 | 1 | 1 | 1 | 1 | 1 | 0 | 1 | 1 | 0 | 0 | 0 | 1 | 0 | 1 | 0 | 0 | 1 | 1 | 1 | 1 | 1 |
| 1 | 1 | 1 | 0 | 1 | 1 | 1 | 1 | 0 | 0 | 0 | 1 | 0 | 0 | 1 | 0 | 1 | 1 | 1 | 0 | 1 | 1 | 1 | 1 | 0 | 0; | and operating using a training sequence selected from one of the at least one training sequence from the first set of training sequences and the at least one training sequence from the second set of training sequences.

Another broad aspect of the disclosure provides use of a training sequence from a set of training sequences consisting of:

| | | | | | | | | | | | | Training Sequence | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 | 1 |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1 | as a training sequence in cellular radio telephony.

The degradation of signal-to-noise ratio (SNR) (see B. Steiner and P. Jung, "Optimum and suboptimum channel estimation for the uplink CDMA mobile radio systems with joint detection", European Transactions on Telecommunications, vol. 5, January-February, 1994, pp. 39-50, and M. Pukkila and P. Ranta, "Channel estimator for multiple co-channel demodulation in TADM mobile systems", Proc. of the 2nd EPMC, Germany) is used herein to evaluate the correlation properties of training sequences and/or to design new training sequences. In MUROS/VAMOS, the interference comes from the other subchannel of the same MUROS/VAMOS pair in the same cell and also from co-channel signals of other cells.

The degradation in SNR can be determined as follows. Let a training sequence of length N be $S=\{s_1, s_2, \ldots, s_N\}$, $s_n \in \{-1,+1\}$, $n=1, \ldots, N$. Consider two synchronous co-channel or MUROS/VAMOS signals with L-tap independent complex channel impulse responses $h_m=(h_{m,1}, h_{m,2}, \ldots, h_{m,L})$, $m=1, 2$. The joint channel impulse response is $h=(h_1, h_2)$. Let the received signal samples at the receiver be: $y=Sh^t+n$ where the noise vector is $n=(n_1, n_2, \ldots, n_{N-L+1})^t$ and $S=[S_1, S_2]$ is a $(N-L+1) \times 2L$ matrix and $S_m$ ($m=1, 2$) is defined as below $$S_m = \begin{bmatrix} S_{m,L} & \cdots & S_{m,2} & S_{m,1} \\ S_{m,L+1} & \cdots & S_{m,3} & S_{m,2} \\ \vdots & \vdots & \vdots & \vdots \\ S_{m,N} & \cdots & S_{m,N-L+2} & S_{m,N-L+1} \end{bmatrix} \quad (1)$$

which is correspondent to the training sequence ($S_{m,1}$, $S_{m,2}, \ldots, S_{m,N}$) (note that $S_1$ and $S_2$ can be constructed with two different training sequences, respectively, either from the same training sequence set or from different training sequence sets).

The least-squared error estimate of the channel is:

$$\hat{h}=(S^t S)^{-1} S^t y. \quad (2)$$

The SNR degradation of training sequences is defined as:

$$d_{SNR}=10 \cdot \log_{10}(1+tr[(S^t S)^{-1}]) \text{ (dB)} \quad (3)$$

where tr[X] is the trace of matrix X and $Q=[q_{ij}]_{2L \times 2L}=S^t S$ is a correlation matrix including the autocorrelations of $S_1$ and $S_2$, and cross-correlation between $S_1$ and $S_2$ with calculation of entries as:

$$q_{ij} = \quad (4)$$

$$\begin{cases} \sum_{n=1}^{N-L+1} s_{1,n+L-i} s_{1,n+L-j}, & \text{if } i \le L, j \le L \\ \sum_{n=1}^{N-L+1} s_{1,n+L-i} s_{2,n+2L-j}, & \text{if } i \le L, L < j \le 2L \text{ or } j \le L, L < i \le 2L \\ \sum_{n=1}^{N-L+1} s_{2,n+2L-i} s_{2,n+2L-j}, & \text{if } L < i \le 2L, L < j \le 2L. \end{cases}$$

Based on definitions (1)-(3), the pairwise SNR degradation values between GSM training sequences are calculated and listed in Table 1.

TABLE 1

Pairwise SNR degradation values of existing GSM training sequences (in dB)

| TSC# | 0 | 1 | 2 | 3 | 4 | 5 | 6 | 7 |
|---|---|---|---|---|---|---|---|---|
| 0 | — | 6.91 | 3.24 | 3.08 | 4.75 | 4.87 | 4.85 | 3.88 |
| 1 | 6.91 | — | 3.08 | 2.72 | 5.03 | 4.70 | 4.70 | 3.67 |
| 2 | 3.24 | 3.08 | — | 6.91 | 5.57 | 3.97 | 5.12 | 7.16 |
| 3 | 3.08 | 2.72 | 6.91 | — | 4.06 | 4.99 | 4.79 | 6.91 |
| 4 | 4.75 | 5.03 | 5.57 | 4.06 | — | 11.46 | 5.87 | 6.11 |
| 5 | 4.87 | 4.70 | 3.97 | 4.99 | 11.46 | — | 3.73 | 5.03 |
| 6 | 4.85 | 4.70 | 5.12 | 4.79 | 5.87 | 3.73 | — | 5.72 |
| 7 | 3.88 | 3.67 | 7.16 | 6.91 | 6.11 | 5.03 | 5.72 | — |

The average, minimum and maximum pairwise SNR degradation values between different GSM training sequences equal 5.10 dB, 2.72 dB and 11.46 dB, respectively. Table 1 demonstrates that some GSM training sequence pairs result in reasonable SNR degradation values while some GSM training sequence pairs are strongly correlated. It seems not to be suitable to apply all existing GSM training sequences to MUROS/VAMOS. It would be desirable to have new training sequences for MUROS/VAMOS, each having very good autocorrelation properties and very good cross-correlation properties with the corresponding GSM training sequence. It would also be desirable to reduce the effects of co-channel interference, cross-correlation properties for any pairs of new training sequences and cross-correlation properties for any pairs of new training sequences and legacy GSM training sequences through further optimization.

Tables 2 and 3 present the pairwise SNR degradation performance of the sequences of FIG. 3 between any pairs of these sequences and GSM training sequences, and between any pairs of these sequences themselves.

TABLE 2

Pairwise SNR degradation values between any pairs of sequences of FIG. 3 and GSM training sequences (in dB).

| TSC# | 0 | 1 | 2 | 3 | 4 | 5 | 6 | 7 |
|---|---|---|---|---|---|---|---|---|
| 0 | 2.14 | 3.38 | 3.20 | 3.03 | 2.43 | 2.31 | 2.25 | 2.71 |
| 1 | 4.87 | 2.13 | 2.59 | 3.30 | 2.58 | 2.36 | 2.26 | 2.79 |
| 2 | 3.20 | 3.03 | 2.14 | 3.38 | 2.26 | 2.34 | 2.51 | 2.38 |
| 3 | 2.59 | 3.30 | 4.87 | 2.13 | 2.48 | 2.31 | 2.53 | 2.29 |
| 4 | 2.71 | 2.55 | 2.40 | 2.78 | 2.05 | 2.38 | 2.24 | 2.41 |
| 5 | 2.33 | 2.77 | 2.74 | 2.86 | 2.21 | 2.11 | 2.41 | 2.38 |
| 6 | 2.78 | 2.68 | 2.69 | 2.70 | 2.26 | 2.93 | 2.06 | 2.28 |
| 7 | 2.50 | 3.93 | 2.79 | 2.41 | 2.21 | 2.31 | 2.20 | 2.12 |

TABLE 3

Pairwise SNR degradation values between any pairs of sequences of FIG. 3 (in dB).

| TSC# | 0 | 1 | 2 | 3 | 4 | 5 | 6 | 7 |
|---|---|---|---|---|---|---|---|---|
| 0 | — | 2.37 | 2.35 | 2.52 | 3.23 | 2.80 | 2.32 | 3.64 |
| 1 | 2.37 | — | 2.52 | 2.74 | 3.23 | 3.49 | 2.93 | 2.60 |
| 2 | 2.35 | 2.52 | — | 2.37 | 3.41 | 2.69 | 2.86 | 3.17 |
| 3 | 2.52 | 2.74 | 2.37 | — | 3.10 | 3.71 | 6.89 | 2.71 |
| 4 | 3.23 | 3.23 | 3.41 | 3.10 | — | 3.66 | 3.71 | 3.79 |
| 5 | 2.80 | 3.49 | 2.69 | 3.71 | 3.66 | — | 3.33 | 3.93 |
| 6 | 2.32 | 2.93 | 2.86 | 6.89 | 3.71 | 3.33 | — | 3.32 |
| 7 | 3.64 | 2.60 | 3.17 | 2.71 | 3.79 | 3.93 | 3.32 | — |

In Table 2, the pairwise SNR degradation values in the diagonal of the table are the results of a sequence of FIG. 3 and a corresponding GSM training sequences. In this document, the corresponding sequences are defined as two sequences with the same training sequence number in two separate sequence tables. The average of the diagonal values in Table 2 equals 2.11 dB. The average, minimum and maximum SNR degradation values between any pairs of sequences of FIG. 3 and GSM TSCs are 2.63 dB, 2.05 dB and 4.87 dB, respectively.

Table 3 shows that the average, minimum and maximum SNR degradation values between any pairs of different sequences of FIG. 3 are 3.19 dB, 2.32 dB and 6.89 dB, respectively.

Both Tables 2 and 3 demonstrate that the average pairwise SNR degradation performance between any pairs of sequences of Table 2 and GSM training sequences, and any pairs of different sequences of Table 2 is good. However, the peak pairwise SNR degradation values shown in Table 2 and 3 may affect co-channel interference cancellation with the introduction of MUROS/VAMOS.

New Training Sequences for MUROS/VAMOS

A. Training Sequences Best-Paired with the Corresponding GSM TSCs

Figures 4A, 4B:
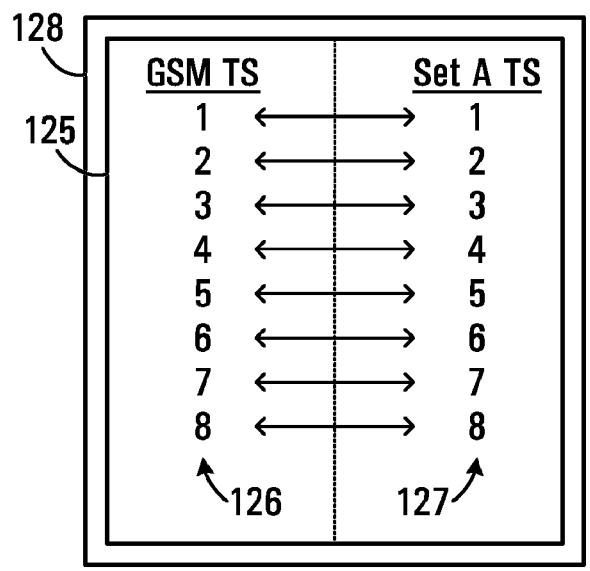
FIG. 4A is a table containing a set of training sequences.
FIG. 4B is a schematic diagram of a computer readable medium containing the training sequences of FIG. 4A.

In an embodiment of the disclosure, a set of eight sequences of length 26 are obtained, through computer search, which are best-paired with the corresponding GSM training sequences, respectively, in terms of SNR degradation calculated with (1)-(3). FIG. 4A shows these best-paired sequences, referred to as Training Sequence Set A, generally indicated at 120 in a data structure 122 stored on a computer readable medium 124. The search was conducted as follows:

1) start with first GSM training sequence;
2) exhaustively search through set of all candidate sequences for the sequence with the lowest SNR degradation, and add the sequence found to the new set, and remove the sequence found from the candidate set;

3) repeat steps 1 and 2 for sequences that are best paired with each of the second through eighth GSM training sequences.

Shown in FIG. 4B is a computer readable medium generally indicated at 128 upon which is stored a data structure 125. The data structure 125 includes the set of standard GSM training sequences 126, and includes the training sequence set A 127. There is a one to one correspondence between the GSM training sequences 126 and the training sequence set A 127.

TABLE 4

Pairwise SNR degradation values between sequences in FIG. 4A and GSM TSCs (in dB).

| TSC# | 0 | 1 | 2 | 3 | 4 | 5 | 6 | 7 |
|---|---|---|---|---|---|---|---|---|
| 0 | 2.09 | 3.05 | 4.10 | 3.08 | 2.88 | 2.52 | 2.49 | 2.64 |
| 1 | 2.60 | 2.09 | 2.67 | 3.18 | 2.56 | 2.44 | 2.57 | 2.67 |
| 2 | 4.10 | 3.08 | 2.09 | 3.05 | 2.36 | 2.80 | 2.57 | 2.35 |
| 3 | 2.67 | 3.18 | 2.60 | 2.09 | 2.62 | 2.37 | 2.66 | 2.19 |
| 4 | 2.47 | 2.53 | 2.27 | 2.69 | 2.04 | 2.34 | 2.26 | 2.27 |
| 5 | 2.15 | 2.15 | 2.64 | 2.53 | 2.18 | 2.07 | 2.42 | 2.22 |
| 6 | 2.38 | 2.30 | 2.48 | 2.50 | 2.28 | 2.42 | 2.05 | 2.24 |
| 7 | 2.55 | 2.72 | 2.32 | 2.25 | 2.37 | 2.51 | 2.19 | 2.07 |

The average, minimum and maximum SNR degradation values between any pairs of sequences in FIG. 4A and GSM training sequences are 2.52 dB, 2.04 dB and 4.10 dB, respectively. The average of the diagonal values in Table 4 equals 2.07 dB. Based on results shown in Table 4, the new training sequences of FIG. 4A are well-designed to be paired with the corresponding GSM training sequences.

Table 5 demonstrates SNR degradation values between sequences listed in FIG. 4A. The average, minimum and maximum pairwise SNR degradation values between sequences best-paired with GSM training sequences are 3.04 dB, 2.52 dB and 4.11 dB, respectively.

TABLE 5

Pairwise SNR degradation values between sequences in FIG. 4A (in dB).

| TSC# | 0 | 1 | 2 | 3 | 4 | 5 | 6 | 7 |
|---|---|---|---|---|---|---|---|---|
| 0 | — | 2.73 | 2.93 | 2.52 | 2.52 | 2.85 | 2.56 | 4.11 |
| 1 | 2.73 | — | 2.52 | 2.90 | 3.29 | 3.15 | 2.87 | 2.76 |
| 2 | 2.93 | 2.52 | — | 2.73 | 3.76 | 2.92 | 3.58 | 3.09 |
| 3 | 2.52 | 2.90 | 2.73 | — | 2.58 | 3.17 | 2.80 | 2.95 |
| 4 | 2.52 | 3.29 | 3.76 | 2.58 | — | 2.69 | 3.73 | 4.11 |
| 5 | 2.85 | 3.15 | 2.92 | 3.17 | 2.69 | — | 3.64 | 2.70 |
| 6 | 2.56 | 2.87 | 3.58 | 2.80 | 3.73 | 3.64 | — | 2.89 |
| 7 | 4.11 | 2.76 | 3.09 | 2.95 | 4.11 | 2.70 | 2.89 | — |

B. Training Sequences with Cyclic Structure with Optimized Autocorrelation and Cross-Correlation Properties A set of training sequences with optimized autocorrelation and cross-correlation properties was determined by computer search using a method described in detail below. The set of training sequences is set out in FIG. 5A, referred to as Training Sequence Set B, generally indicated at 130, in a data structure 132 stored on a computer readable medium 134.

Figures 5A, 5B:
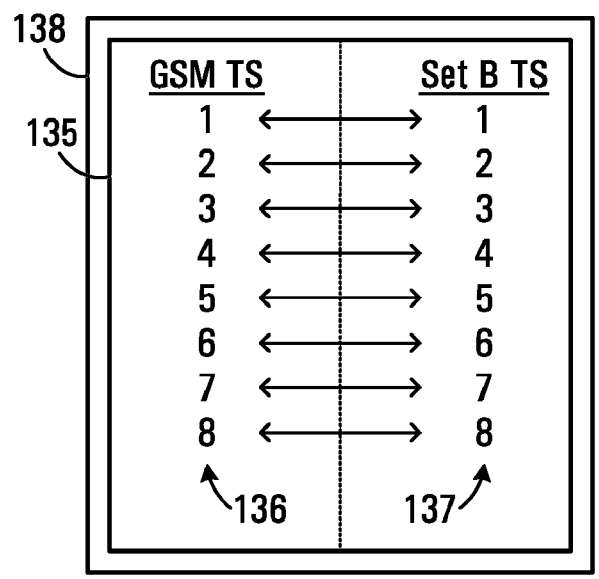
FIG. 5A is a table containing a set of training sequences.
FIG. 5B is a schematic diagram of a computer readable medium containing the training sequences of FIG. 5A.

Shown in FIG. 5B is a computer readable medium generally indicated at 138 upon which is stored a data structure 135. The data structure 135 includes the set of standard GSM training sequences 136, and includes the training sequence set B 137. There is a one to one correspondence between the GSM training sequences 136 and the training sequence set A 137.

The pairwise SNR degradation values between any pairs of new training sequences in FIG. 5A and GSM training sequences are shown in Table 6. The average, minimum and maximum SNR degradation values in Table 6 are 2.43 dB, 2.13 dB and 2.93 dB, respectively. The average of the diagonal values in Table 6 equals 2.22 dB.

TABLE 6

Pairwise SNR degradation values between new training sequences in FIG. 5A and GSM training sequences (in dB).

| TSC# | 0 | 1 | 2 | 3 | 4 | 5 | 6 | 7 |
|---|---|---|---|---|---|---|---|---|
| 0 | 2.27 | 2.67 | 2.77 | 2.59 | 2.43 | 2.68 | 2.30 | 2.31 |
| 1 | 2.35 | 2.26 | 2.39 | 2.78 | 2.59 | 2.75 | 2.28 | 2.93 |
| 2 | 2.88 | 2.55 | 2.25 | 2.27 | 2.51 | 2.39 | 2.51 | 2.74 |
| 3 | 2.53 | 2.37 | 2.32 | 2.26 | 2.67 | 2.27 | 2.75 | 2.29 |
| 4 | 2.17 | 2.34 | 2.21 | 2.64 | 2.20 | 2.20 | 2.34 | 2.42 |
| 5 | 2.24 | 2.26 | 2.28 | 2.73 | 2.36 | 2.14 | 2.55 | 2.32 |
| 6 | 2.61 | 2.26 | 2.48 | 2.14 | 2.52 | 2.93 | 2.13 | 2.45 |
| 7 | 2.40 | 2.23 | 2.23 | 2.30 | 2.30 | 2.36 | 2.58 | 2.21 |

Table 7 demonstrates pairwise SNR degradation values between sequences listed in FIG. 5A. The average, minimum and maximum pairwise SNR degradation values in Table 7 are 3.17 dB, 2.21 dB and 4.75 dB, respectively.

TABLE 7

Pairwise SNR degradation values between new training sequences in FIG. 5A (in dB).

| TSC# | 0 | 1 | 2 | 3 | 4 | 5 | 6 | 7 |
|---|---|---|---|---|---|---|---|---|
| 0 | — | 3.20 | 2.57 | 2.39 | 3.34 | 3.12 | 2.71 | 3.37 |
| 1 | 3.20 | — | 3.29 | 3.44 | 2.21 | 4.75 | 3.59 | 4.64 |
| 2 | 2.57 | 3.29 | — | 2.70 | 3.29 | 4.41 | 2.50 | 3.51 |
| 3 | 2.39 | 3.44 | 2.70 | — | 2.49 | 2.49 | 2.95 | 4.00 |
| 4 | 3.34 | 2.21 | 3.29 | 2.49 | — | 2.43 | 2.46 | 2.37 |
| 5 | 3.12 | 4.75 | 4.41 | 2.49 | 2.43 | — | 3.31 | 4.40 |
| 6 | 2.71 | 3.59 | 2.50 | 2.95 | 2.46 | 3.31 | — | 2.89 |
| 7 | 3.37 | 4.64 | 3.51 | 4.00 | 2.37 | 4.40 | 2.89 | — |

C. Training Sequences without Cyclic Structure

Unlike training sequence set B, a third training sequence set, referred to herein as training sequence set C is composed of sequences that do not maintain cyclic structure. Only optimization procedure II-IV for training sequence set B outlined below are taken into account for generation of training sequence set C. For optimization of SNR degradation between new sequences and GSM training sequences, the sequence set $\Omega 1$ is obtained by selecting $|\Omega 1|$ sequences from $2^{26}$ sequences with minimum average SNR degradation values between sequences in $|\Omega 1|$ and all GSM training sequences. Training sequence set C is listed in FIG. 6A, generally indicated at 140 in a data structure 142 stored on a computer readable medium 144.

Figures 6A, 6B:
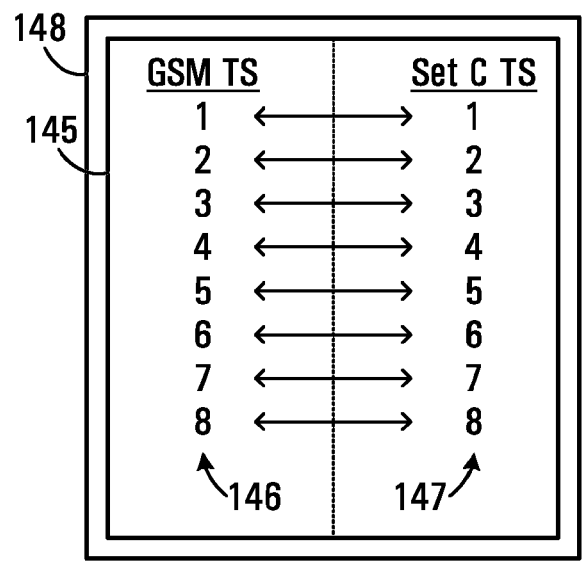
FIG. 6A is a table containing a set of training sequences.
FIG. 6B is a schematic diagram of a computer readable medium containing the training sequences of FIG. 6A.

Shown in FIG. 6B is a computer readable medium generally indicated at 148 upon which is stored a data structure 145. The data structure 145 includes the set of standard GSM training sequences 146, and includes the training sequence set C 147. There is a one to one correspondence between the GSM training sequences 146 and the training sequence set C 147.

The pairwise SNR degradation values between any pairs of new training sequences in FIG. 6A and GSM training sequences are shown in Table 8. The average, minimum and maximum SNR degradation values in Table 8 are 2.34 dB, 2.11 dB and 2.87 dB, respectively. The average of the diagonal values in Table 8 equals 2.16 dB.

TABLE 8

Pairwise SNR degradation values between new training sequences in FIG. 6A and GSM training sequences (in dB).

| GSM TSC# | New TS# | | | | | | | |
|---|---|---|---|---|---|---|---|---|
| | 0 | 1 | 2 | 3 | 4 | 5 | 6 | 7 |
| 0 | 2.18 | 2.50 | 2.55 | 2.64 | 2.23 | 2.37 | 2.31 | 2.62 |
| 1 | 2.37 | 2.20 | 2.60 | 2.39 | 2.41 | 2.67 | 2.67 | 2.61 |
| 2 | 2.52 | 2.29 | 2.18 | 2.31 | 2.87 | 2.40 | 2.27 | 2.33 |
| 3 | 2.52 | 2.61 | 2.41 | 2.16 | 2.49 | 2.29 | 2.48 | 2.18 |
| 4 | 2.26 | 2.23 | 2.17 | 2.37 | 2.16 | 2.27 | 2.30 | 2.24 |
| 5 | 2.17 | 2.25 | 2.26 | 2.32 | 2.23 | 2.18 | 2.45 | 2.20 |
| 6 | 2.37 | 2.33 | 2.31 | 2.28 | 2.24 | 2.28 | 2.13 | 2.38 |
| 7 | 2.34 | 2.24 | 2.25 | 2.25 | 2.13 | 2.29 | 2.11 | 2.12 |

Table 9 demonstrates pairwise SNR degradation values between sequences listed in FIG. 6A. The average, minimum and maximum pairwise SNR degradation values in Table 9 are 3.18 dB, 2.44 dB and 4.19 dB, respectively.

TABLE 9

Pairwise SNR degradation values between new training sequences in FIG. 6A (in dB).

| TSC# | TSC# | | | | | | | |
|---|---|---|---|---|---|---|---|---|
| | 0 | 1 | 2 | 3 | 4 | 5 | 6 | 7 |
| 0 | — | 3.62 | 2.74 | 3.24 | 3.80 | 2.90 | 2.65 | 2.81 |
| 1 | 3.62 | — | 3.52 | 2.86 | 4.19 | 2.56 | 3.51 | 3.21 |
| 2 | 2.74 | 3.52 | — | 3.42 | 3.00 | 2.99 | 3.06 | 4.02 |
| 3 | 3.24 | 2.86 | 3.42 | — | 2.52 | 2.69 | 3.53 | 3.80 |
| 4 | 3.80 | 4.19 | 3.00 | 2.52 | — | 2.44 | 2.92 | 3.12 |
| 5 | 2.90 | 2.56 | 2.99 | 2.69 | 2.44 | — | 3.43 | 3.42 |
| 6 | 2.65 | 3.51 | 3.06 | 3.53 | 2.92 | 3.43 | — | 3.00 |
| 7 | 2.81 | 3.21 | 4.02 | 3.80 | 3.12 | 3.42 | 3.00 | — |

Sequence Search Procedure—First Method

Figure 7:
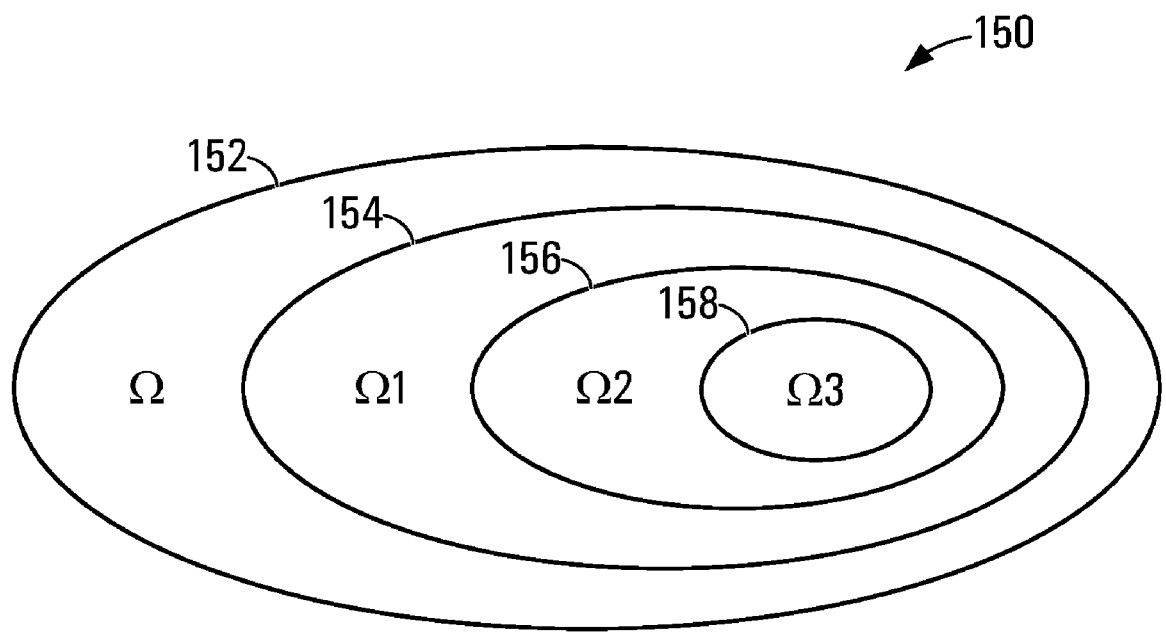
FIG. 7 depicts several sets used to define a set of training sequences.

FIG. 7 illustrates a procedure for finding a second set of $|\Omega 3|$ training sequences $\Omega 3$ that has auto-correlation and cross-correlation properties having regard to a target set of training sequences $\Psi$. The procedure involves determining sequence sets $\Omega$ 152, $\Omega 1$ 154, $\Omega 2$ 156 and $\Omega 3$ 158 where $\Omega \supset \Omega 1 \supset \Omega 2 \supset \Omega 3$ and $|\Omega 3|$=the number of sequences to be found, where |•| represents the number of elements in a set. $\Omega$ 152 is a subset of the set of all possible sequences 150 determined through a first optimization step. $\Omega 1$ 154 is a subset of $\Omega$ 152 determined through a second optimization step. $\Omega 2$ 156 is a subset of $\Omega 1$ 154 determined through a third optimization step. $\Omega 3$ 158 is a subset of $\Omega 2$ 156 determined through a fourth optimization step.

Figure 8:
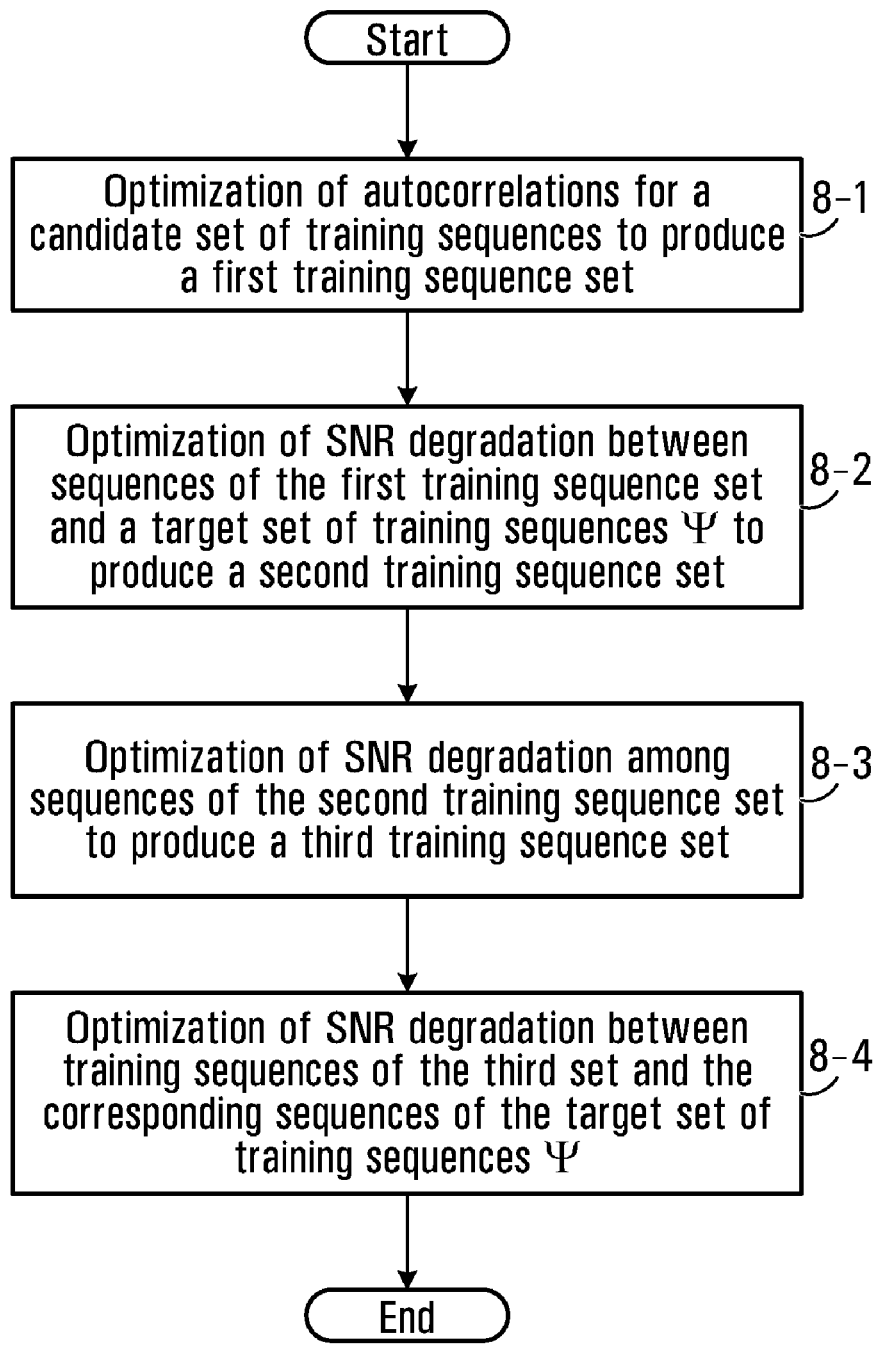
FIG. 8 is a flowchart of a first method of determining training sequences.

The method is computer implemented and will be described with reference to the flowchart of FIG. 8. The method begins at block 8-1 with the optimization of autocorrelations for a candidate set of training sequences to produce a first training sequence set. The method continues at block 8-2 with optimization of SNR degradation between sequences of the first training sequence set and a target set of training sequences $\Psi$ to produce a second training sequence set. The method continues at block 8-3 with optimization of SNR degradation among sequences of the second training sequence set to produce a third training sequence set. The method continues at block 8-4 with the optimization of SNR degradation between training sequences of the third set and the corresponding sequences of the target set of training sequences $\Psi$. The output of block 8-4 is a fourth set of training sequences, and this is the new training sequence set. This set is output for use in a system with multi-user transmission. Another embodiment provides a computer readable medium having instructions stored thereon which, when executed by a computer, cause the method of FIG. 8 to be performed.

In some embodiments, steps 8-2 and 8-3 are performed in the reverse order to that shown and described above. This results in a computer method comprising: optimizing cross-correlations between sequences among a first training sequence set to produce a second training sequence set; optimizing cross-correlations between sequences of the second training sequence set and a target training sequence set to produce a third training sequence set; optimizing cross-correlations between sequences of the third training sequence set and corresponding sequences of the target training sequence set to produce a fourth training sequence set; and outputting the fourth training sequence set for use in a multi-user transmission system.

First Optimization step: Optimization of autocorrelations: Consider all binary sequences of a desired length. Optionally copy some of the last bits of the sequence onto the front to make the sequence somewhat cyclic in nature. Search for sequences with zero autocorrelation values for a range of non-zero shifts.

In order to achieve zero autocorrelations, the sequences upon which autocorrelation are determined must have even length. If an odd length sequence is required, an additional bit is added to the set of sequences with zero autocorrelation values. This might for example be done by copying the first bit of the original sequence, or by appending −1 or +1 for further optimization of cross-correlation properties.

The output of this step is a set of sequences, $\Omega$, with optimized autocorrelation properties. For sequences to which an additional bit was added, the maximum magnitude of autocorrelation coefficients would be 1 in correlation matrix $Q=S'S$ in (3);

Second Optimization Step: optimization of SNR degradation between new sequences and target set of training sequences $\Psi$: a subset of $\Omega$, $\Omega 1$, is obtained by selecting $|\Omega 1|$ sequences from $\Omega$ with minimum average SNR degradation values between sequences in $|\Omega 1|$ and the target set of training sequences $\Psi$. The average SNR degradation for a given sequence from $\Omega$ is determined by computing the degradation for that sequence and each of the target set training sequences and averaging the result.

Third Optimization Step: optimization of SNR degradation between new sequences: a subset of $\Omega 1$, $\Omega 2$, with minimum average SNR degradation values between sequences in $|\Omega 2|$ is selected. The following is an example of how the third optimization step might be performed:

1) pick a first sequence from $\Omega 2$ and remove from $\Omega 2$;
2) examine all remaining sequences in $\Omega 2$ for the one with the lowest SNR degradation with the first sequence and select that as the second sequence, and remove from $\Omega 2$;
3) examine all remaining sequences in $\Omega 2$ for the one with the lowest average SNR degradation with the first sequence and the second sequence, and remove from $\Omega 2$;

4) and so on until a desired number of sequences have been identified. Calculate the average SNR degradation between the sequences thus identified;

5) repeat steps 1 to 4 using a different first sequence from Ω2 to generate a respective set of sequences and a respective average SNR degradation;

6) of all the sets of sequences thus generated, pick the set of sequences with the minimum average SNR degradation.

Fourth Optimization Step: optimization of SNR degradation between new training sequences and the corresponding sequences of the target set of training sequences Ψ: |Ω3| sequences out of the sequence set Ω2 are selected. This step is used to determine pairs of training sequences that include one from the target set and one from the new set. The following is an example approach to performing this step:

a) select a training sequence from the target set;
b) find the training sequence in the new set that has the lowest SNR degradation with the training sequence of the target set, and pair that training sequence with the first training sequence from the target set, and remove that training sequence from the set of available training sequences;
c) repeat steps a) and b) until all sequences from the target set have been selected.

The above-described optimization procedure was applied to develop the set of training sequences in FIG. 5A, with |Ω1|=120 and |Ω2|=12. More specifically:

First Optimization Step: optimization of autocorrelations: Consider all binary sequences of length 20 (set size is $2^{20}$). Similar to GSM TSCs, for each of such sequences, copy the last of 5 bits of the sequence and precede these 5 bits at the most significant positions to generate a sequence of length 25; search sequences of length 25 with zero autocorrelation values for non-zero shift [−5, 5] by using the autocorrelation definition $$R(k) = \sum_{n=6}^{25} s_n s_{n+k}, k = -5, \ldots, -1.$$

There are totally 5440 such sequences available.

To be compatible with the current TSC format, the new TSCs length must be 26. The 26th bit of the full-length (length 26) sequences could be obtained either by copying the first bit of the corresponding sequences of length 20 or by appending −1 or +1 for further optimization of cross-correlation properties. Therefore, the set of sequences, Ω, with optimized autocorrelation properties is generated. Both methods will limit the maximum magnitude of autocorrelation coefficients to be 1 in correlation matrix $Q=S'S$ in (3).

Second Optimization Step: optimization of SNR degradation between new sequences and GSM TSCs: a subset of Ω, Ω1, are obtained by selecting |Ω1| sequences from Ω with minimum average SNR degradation values between sequences in |Ω1| and all GSM TSCs. The average SNR degradation for a given sequence from Ω is determined by computing the degradation for that sequence and each of the GSM sequences and averaging the result.

Third Optimization Step: optimization of SNR degradation between new sequences: a subset of Ω1, Ω2, with minimum average SNR degradation values between sequences in |Ω2| are selected.

Fourth Optimization Step: optimization of SNR degradation between new training sequences and the corresponding GSM TSCs: |Ω3|=8 sequences out of the sequence set Ω2 are determined. The result is the set B of sequences FIG. 5A.

Sequence Search Procedure—Second Method

In another method of sequence search, a search approach that is similar to the above-described 'first method' is provided in which the first optimization step is omitted. In this case, the method begins with the second optimization step of the first method, and the sequence set Ω1 is obtained by selecting |Ω1| sequences from all possible sequences with minimum average SNR degradation values between sequences in |Ω1| and all the sequences of the target set Ψ. Note that the sequences are not required to be cyclic in this embodiment. Using the language of the flowchart of FIG. 8, block 8-1 is omitted, and the "first training sequence set" becomes the candidate set of training sequences.

Applied to the MUROS/VAMOS problem, in the second optimization step, the sequence set Ω1 is obtained by selecting |Ω1| sequences from all $2^{26}$ possible sequences of length 26 with minimum average SNR degradation values between sequences in |Ω1| and all the GSM training sequences. The result is the set of sequences C of FIG. 6A above.

Assignment of Training Sequences

Having defined a new set of training sequences or a part of a new set of training sequences for use in conjunction with a target set of training sequences, for example the set A defined above or a part of the set A in conjunction with legacy GSM training sequences, set B defined above or a part of the set B in conjunction with legacy GSM training sequences or set C defined above or a part of set C in conjunction with legacy GSM training sequences, various mechanisms are provided for assigning training sequences. Note these mechanisms are not specific to the examples provided herein. A specific example of multi-user operation is the above described MUROS/VAMOS operation, for example, specific implementations of which include the OSC or co-TCH or Adaptive Symbol Constellation implementations thereof.

In a cell within which multi-user transmission is being implemented, in interference limited scenarios there is interference from at least two sources. This includes interference from the other user(s) on the same physical transmission resource within the cell, and interference from mobile stations of the same physical transmission resource in other cells. Conventional mobile stations are already equipped to deal with the interference from mobile stations using the same physical transmission resource in other cells.

A mobile station that is specifically aware of multi-user operation will be referred to as "multi-user aware". In a specific example, a mobile station that is aware of VAMOS aware operation might, for example, be referred to as a VAMOS aware mobile station. Such mobile devices are configured to be able to use any training sequence of the target set and any training sequence of the new set. Mobile stations that are not specifically aware of multi-user operation will be referred to as "multi-user unaware". Such mobile devices are configured to be able to use only training sequences of the target set. Note that multi-user unaware mobile stations may still be served in a multi-user context; such a mobile station will treat the interference from other user(s) on the same physical transmission resource in the same cell in the same manner as it treats mobile stations using the same physical transmission resource in other cells.

Similarly, networks may or may not have multi-user capability. A network that has multi-user capability functions using the target set and the new set of training sequences, while a network that does not have multi-user capability uses only the target set of training sequences.

In some embodiments, the assignment of training sequences to base stations is done during network configuration, and does not change until a reconfiguration is performed. A given multi-user aware network element such as a base station is configured with a training sequence from the target set and a training sequence from the new set. In the event a base station performs multi-carrier transmission, the base station is configured with a respective training sequence from the target set and a respective training sequence from the new set for each carrier frequency that it uses. The training sequence from the new set is the training sequence that is best paired with the training sequence of the target set and vice versa. In such a case, the training sequences assigned to the mobile stations will be a function of the previously performed network configuration. As a mobile station moves between coverage areas, the training sequences assigned will change. In some embodiments, the same training sequence is assigned for a given mobile station for both uplink transmission and downlink transmission. In other embodiments, different training sequences may be assigned.

The behaviour of the networks can be divided into two types: behaviour when a timeslot is to be used for only a single user, and behaviour when a timeslot is to be used for multiple users.

Behaviour when a Timeslot is to be Used for a Single User:
A) When a multi-user aware MS is to be served by a network without multi-user capability, one training sequence from the target set will be assigned for this MS, namely the training sequence allocated to the serving base station during network configuration or otherwise. A multi-user aware mobile station is made aware of and capable of using both the target set of training sequences and the new set of training sequences.
B) When a multi-user aware MS is to be served by a network with multi-user capability, if there is a vacant timeslot, this MS does not need to share a timeslot with another MS. Since on average new training sequences have been designed to have better correlation properties than training sequences of the target set, one new training sequence will be assigned for this MS, namely the new training sequence allocated to the serving base station during network configuration or otherwise.

Behaviour when a Timeslot is to be Used for Multiple Users
A) When a first multi-user aware MS, MS-A, is served by a network with multi-user capability, as discussed above, a new training sequence is assigned to MS-A, namely the new training sequence allocated to the serving base station during network configuration or otherwise. If there is a request to share the same timeslot with a second MS, MS-B, no matter whether MS-B is a multi-user aware MS or not, the training sequence of the target set which is best-paired with the new training sequence being used by MS-A will be assigned to MS-B, namely the training sequence of the target set allocated to the serving base station during network configuration or otherwise.
B) When a first multi-user unaware MS, MS-A, is served by a network with multi-user capability, a training sequence from the target set is assigned to MS-A, namely the training sequence from the target set allocated to the serving base station during network configuration or otherwise. If there is a request to share MS-A with a second MS that is multi-user aware, MS-B, in the same timeslot, the new training sequence which is best-paired with the training sequence of the target set being used by MS-A will be assigned to MS-B, namely the new training sequence allocated to the serving base station during network configuration or otherwise.

Figure 9A:
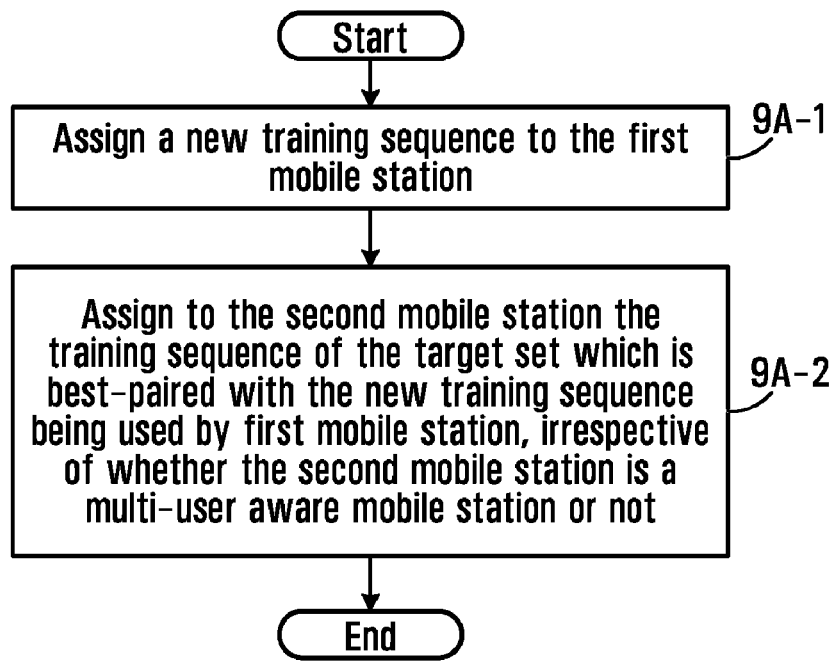
FIG. 9A is a flowchart of a first method of assigning training sequences.
Figure 9B:
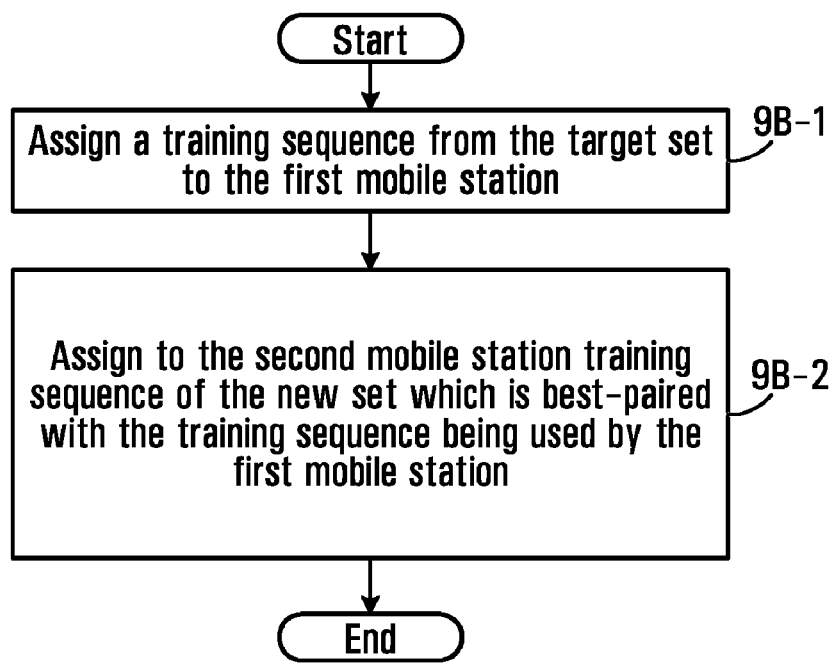
FIG. 9B is a flowchart of a second method of assigning training sequences.

Two flowcharts of an example method of training sequence assignment using multi-user slots are shown in FIGS. 9A and 9B. FIG. 9A relates to case A) described above, while FIG. 9B relates to case B) described above.

Referring now to FIG. 9A, when a first multi-user aware mobile station is to share with a second mobile station, block 9A-1 involves assigning a new training sequence to the first mobile station. Block 9A-2 involves assigning to the second mobile station the training sequence of the target set which is best-paired with the new training sequence being used by first mobile station, irrespective of whether the second mobile station is a multi-user aware mobile station or not;

Referring now to FIG. 9B, when a first multi-user unaware mobile station is to share with a second mobile station that is multi-user aware, block 9B-1 involves assigning a training sequence from the target set to the first mobile station. Block 9B-2 involves assigning to the second mobile station the training sequence of the new set which is best-paired with the training sequence being used by the first mobile station.

Example Transmitter and Receiver Implementations

Figure 10A:
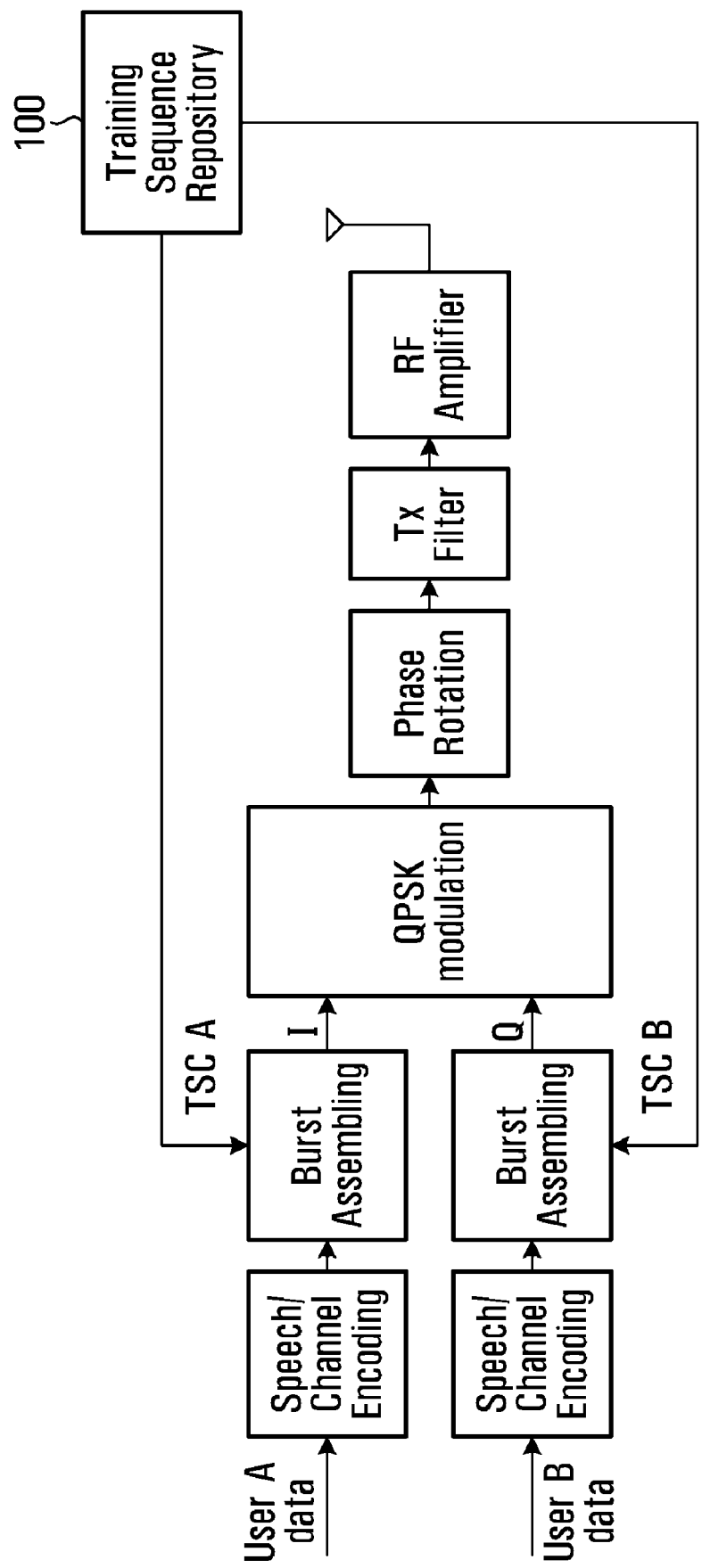
FIG. 10A is a block diagram of a transmitter for OSC downlink transmission.

Various detailed example transmitter and receiver implementations will now be described. FIG. 10A shows a transmitter of OSC (orthogonal subchannels) (or Adaptive Symbol Constellation) for downlink transmission. Most of the components are standard and will not be described in detail. The transmitter includes a training sequence repository 200 containing a target training sequence set and a new training sequence set generated using one of the methods described above. Typically, during network configuration or otherwise, a training sequence from the target set and a training sequence from the new set are assigned to the transmitter. In some embodiments, for multi-user slots, the training sequences thus assigned are used in accordance with the method of FIG. 9A or 9B to name a few specific examples. The remainder of the drawing is a specific example of a signal generator for generating a multi-user signal.

Figure 10B:
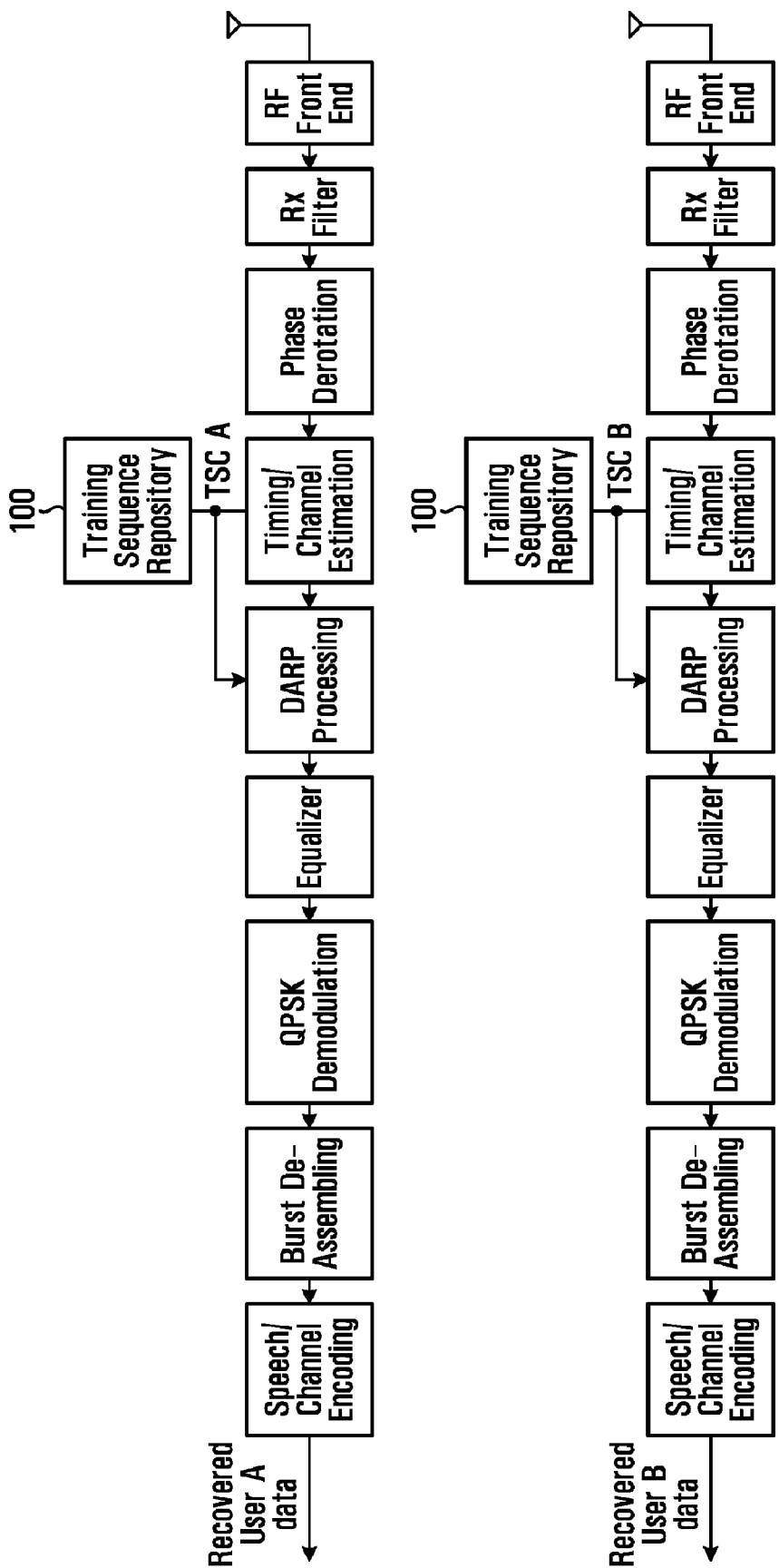
FIG. 10B is a block diagram showing a pair of receivers of OSC subchannels.

FIG. 10B shows a pair of receivers of OSC (orthogonal subchannels) for downlink transmission. Most of the components are standard and will not be described in detail. Each receiver includes a respective memory 210 containing a target training sequence set and a new training sequence set generated using one of the methods described above. One of these, referred to as training sequence A, is used by the top receiver to perform timing/channel estimation and DARP processing, and another of these, referred to as training sequence B, is used by the bottom receiver to perform timing/channel estimation and DARP processing. The training sequences used by the receivers are assigned by the network, and must match up with the training sequences transmitted. When a mobile station moves to a different coverage area to which different training sequences have been assigned, the mobile station changes training sequence it uses accordingly.

Figure 11A:
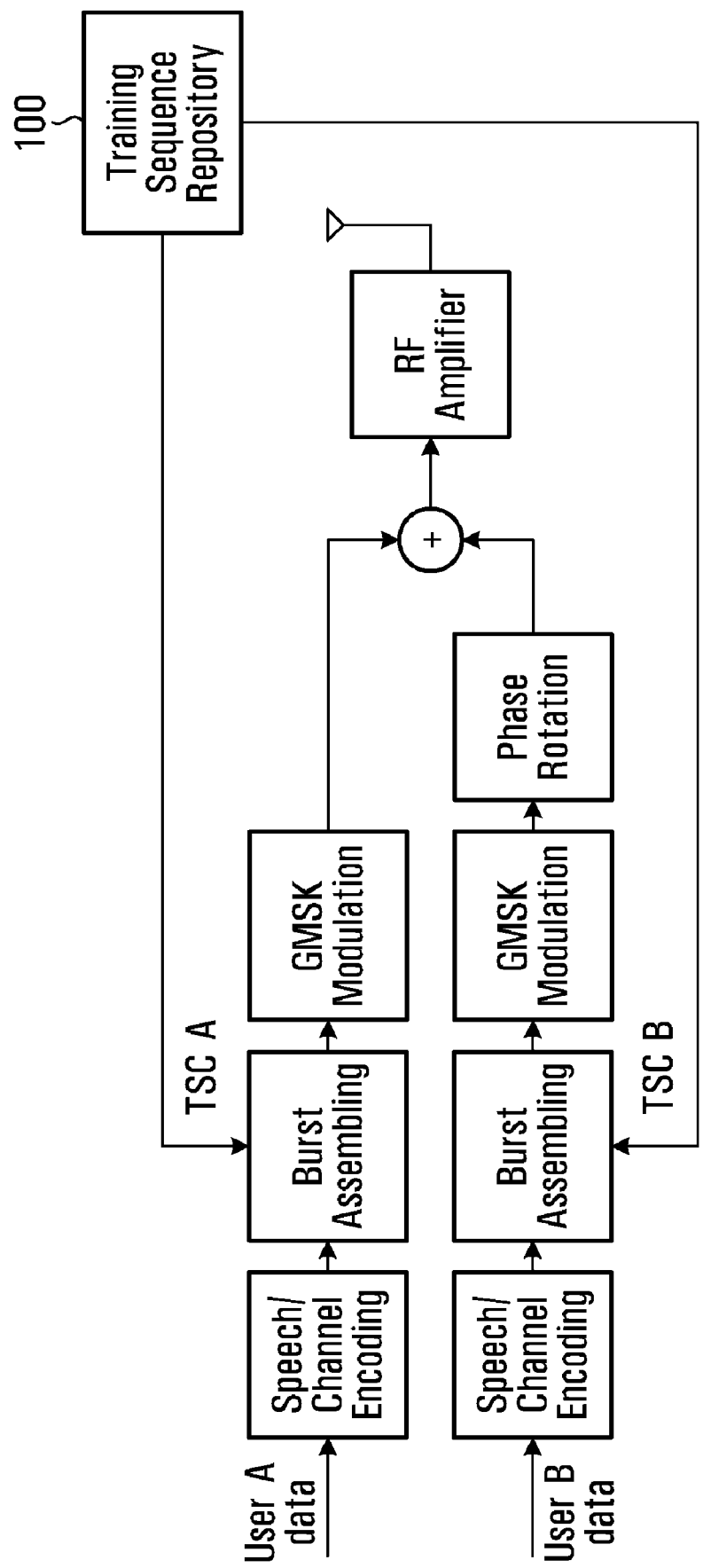
FIG. 11A is a block diagram of transmitter of co-TCH for downlink transmission.

FIG. 11A shows a transmitter of co-TCH (co-traffic channel) for downlink transmission. Most of the components are standard and will not be described in detail. The transmitter includes a training sequence repository 200 containing a target training sequence set and a new training sequence set generated using one of the methods described above. Typically, during network configuration or otherwise, a training sequence from the target set and a training sequence from the new set are assigned to the transmitter. In some embodiments, for multi-user slots, the training sequences thus assigned are used in accordance with the method of FIG. 9A or 9B to name a few specific examples. The remainder of the drawing is a specific example of a signal generator for generating a multi-user signal.

Figure 11B:
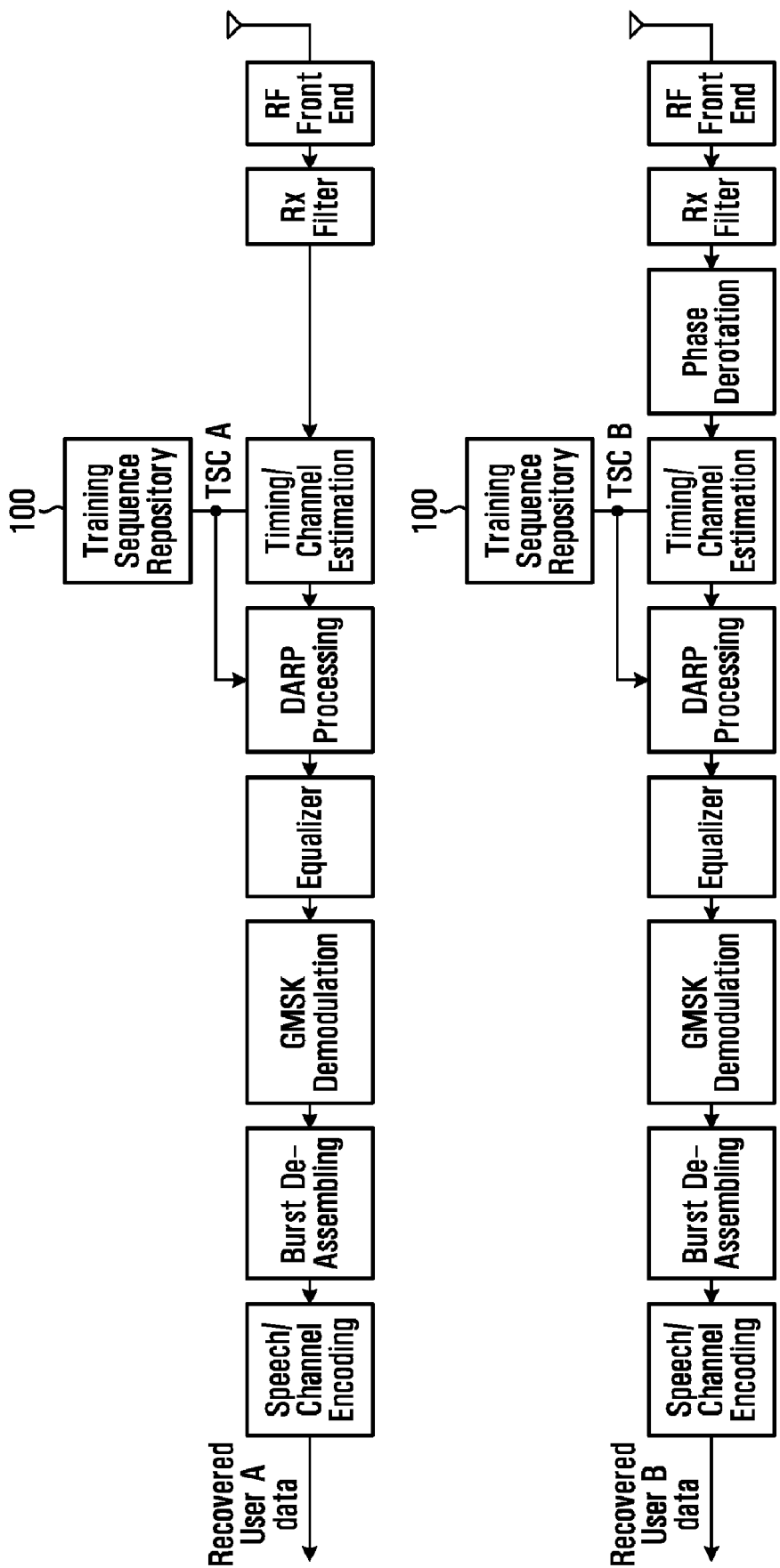
FIG. 11B is a block diagram of a pair of receivers of co-TCH downlink transmission.

FIG. 11B shows a pair of receivers of co-TCH (co-traffic channel) for downlink transmission. Most of the components are standard and will not be described in detail. Each receiver includes a respective memory 210 containing a target training sequence set and a new training sequence set generated using one of the methods described above. One of these, referred to as training sequence A, is used by the top receiver to perform timing/channel estimation and DARP processing, and another of these, referred to as training sequence B, is used by the bottom receiver to perform timing/channel estimation and DARP processing. The training sequences used by the receivers are assigned by the network, and must match up with the training sequences transmitted. When a mobile station moves to a different coverage area to which different training sequences have been assigned, the mobile station changes training sequence it uses accordingly.

Figure 12A:
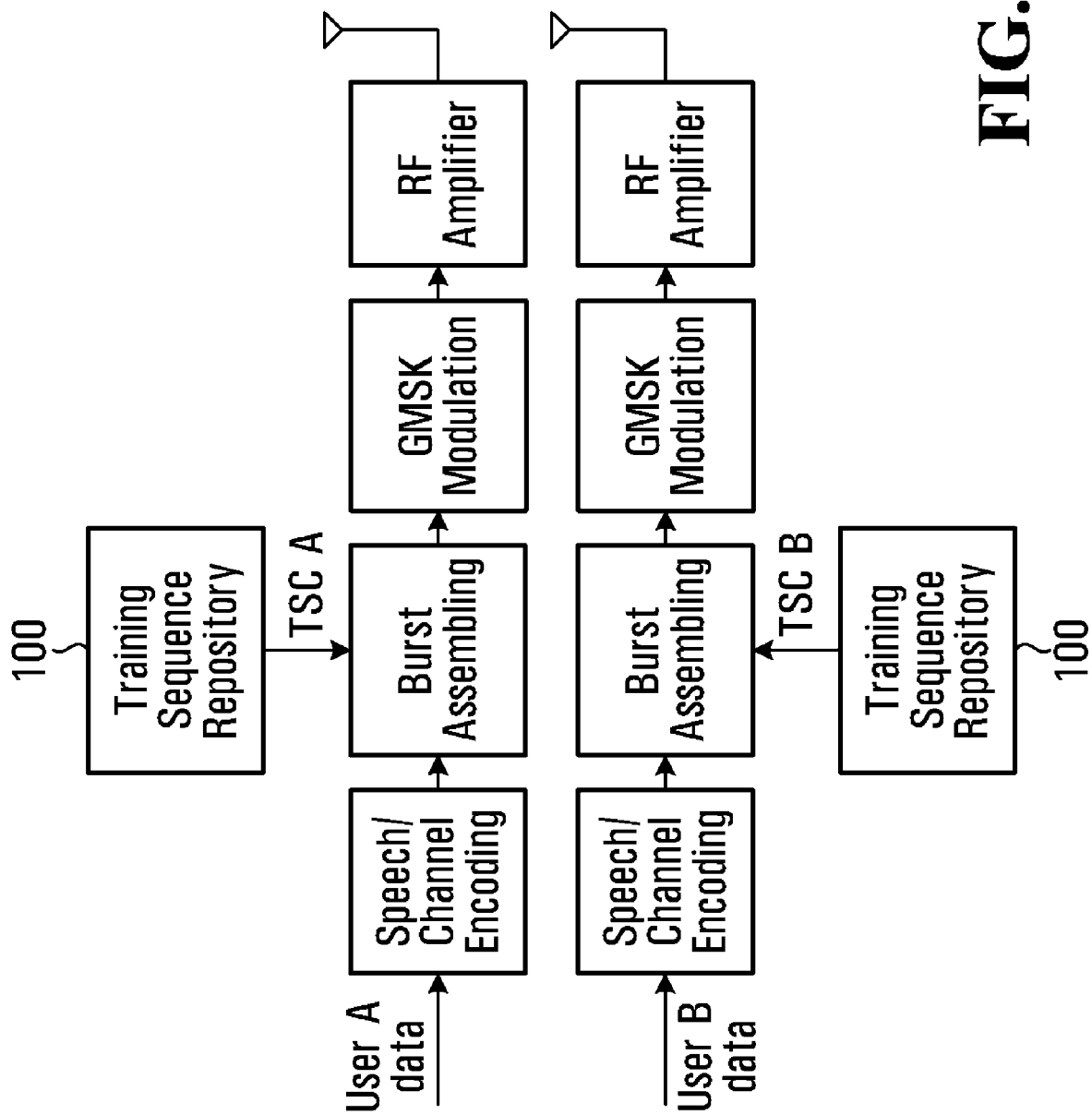
FIG. 12A shows a pair of transmitters of OSC or co-TCH for uplink transmission.

FIG. 12A shows a pair of transmitters of OSC or co-TCH (co-traffic channel) for uplink transmission. Most of the components are standard and will not be described in detail. Each transmitter includes a training sequence repository 210 a target training sequence set and a new training sequence set generated using one of the methods described above. The two transmitters employ the same carrier frequency and the same timeslot. This is similar to the multi-user signal generated by the network, but in this case, the respective components are generated in respective mobile stations rather than in a single transmitter. The training sequences used for uplink transmission are assigned by the network and will change when a given mobile station is handed off to a different coverage area.

Figure 12B:
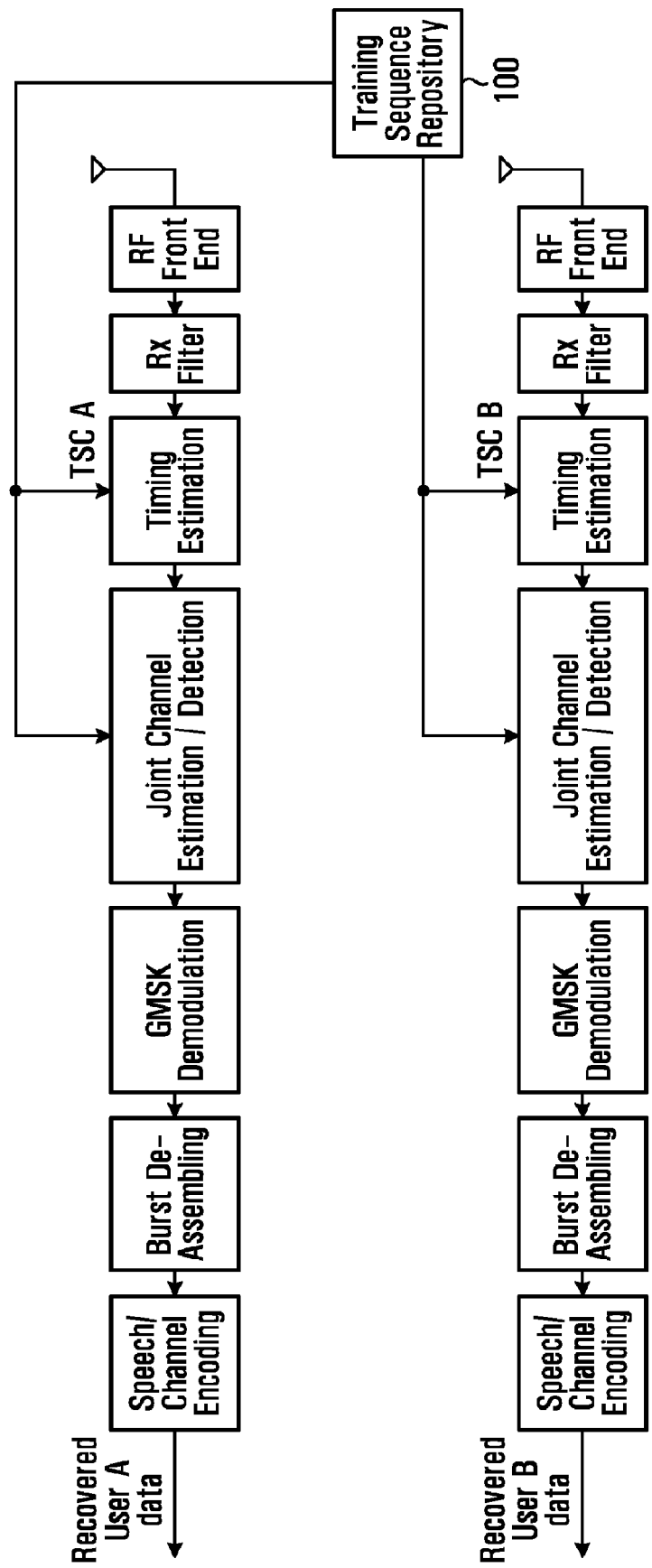
FIG. 12B is a block diagram of a receiving apparatus composed of two receivers for receiving respective transmissions from the pair of transmitters of FIG. 12A.

FIG. 12B shows a receiving apparatus composed of two receivers for receiving respective transmissions from the pair of mobile stations of FIG. 12A in OSC or co-TCH for uplink transmission. Most of the components are standard and will not be described in detail. The receivers include a training sequence repository 100 containing a target training sequence set and a new training sequence set generated using one of the methods described above. One of these, referred to as training sequence A, is used by the top receiver to perform timing estimation, joint channel estimation/detection, and another of these, referred to as training sequence B, is used by the bottom receiver to perform timing estimation, joint channel estimation/detection.

In some embodiments, the approaches described herein are used to produce training sequences for the GSM frame format described with reference to FIG. 1. More generally, the approaches can be applied to transmit frame formats in which the content for a given user comprises at least a respective training sequence and payload, the payload simply comprising any non-training sequence content.

In all of the embodiments described, SNR degradation has been used as an optimization criterion for optimizing cross-correlation properties of sequences. More generally, other optimization criterion can be used to optimize the cross-correlation properties of sequences. Specific examples include:
1) parameters related to the amplitude of cross-correlation coefficients (the maximal value, the average value, the variance, etc.)
2) simulation-based optimization;
3) other correlation optimization criteria.

In some embodiments, each base station is encoded with the entire target training sequence set and the entire new training sequence set. For example, for transmitting purposes, the training sequence repository 200 of a base station, may be configured with the entire target training sequence set and the entire new training sequence set.

In another embodiment, each base station, or more generally, each transmitter, is encoded with at least one training sequence from the target training sequence set (for example one training sequence of all of the training sequences), and at least one training sequence from the new training sequence set (for example one training sequence or all of the training sequences). The training sequence(s) from the new training sequence set may include the training sequence(s) from the new training sequence set that are best paired with the training sequence(s) from the target training sequence set. In some embodiments, each base station is configured with such training sequences during network setup.

A transmitter or receiver encoded with at least one training sequence from a set consisting of the target set, and at least one training sequence from a set consisting of the new training sequence set may also be encoded with one or more training sequences other than the target training sequence set and the new training sequence set.

In some embodiments, each receiver, for example each mobile station, is encoded with at least one (for example one or all) training sequence of the target training sequence set and at least one (for example one or all) of the training sequences of the new training sequence set. For example, for transmitting purposes, the training sequence repository 210 of a mobile station, may be configured with the at least one target training sequence and the at least one new training sequence. When encoded with all of the training sequences of the target training sequence set and the new training sequence set, this will allow the mobile station to perform handoffs between base stations that are assigned any training sequence(s) from the target training sequence set and/or the new training sequence set.

A transmitter or a receiver that is encoded with a training sequence is a transmitter or a receiver that has the training sequence somehow stored and useable by the transmitter or receiver. A transmitter or a receiver, such as a base station or a mobile station, having a particular training sequence is a transmitter or a receiver that is able to use particular training sequence. This does not convey an active step of storing the training sequence on the mobile station, although it may be preceded by such an active step. It may have been previously stored for example during device configuration.

Numerous modifications and variations of the present disclosure are possible in light of the above teachings. It is therefore to be understood that within the scope of the appended claims, embodiments may be practiced otherwise than as specifically described herein.

We claim:
1. A device comprising:
a training sequence repository containing at least one training sequence from a set of training sequences consisting of

| Training Sequence | | | | | | | | | | | | | | |
|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 |
| 0 | 1 | 0 | 1 | 1 | 1 | 1 | 0 | 1 | 0 | 0 | 1 | 1 | 0 | 1 |
| 0 | 1 | 0 | 0 | 0 | 0 | 0 | 1 | 0 | 1 | 1 | 0 | 0 | 0 | 1 |
| 0 | 0 | 1 | 0 | 1 | 1 | 0 | 1 | 1 | 1 | 0 | 1 | 1 | 1 | 0 |
| 0 | 1 | 1 | 1 | 0 | 1 | 0 | 0 | 1 | 1 | 1 | 1 | 0 | 1 | 0 |
| 0 | 1 | 0 | 0 | 0 | 0 | 0 | 1 | 0 | 0 | 1 | 1 | 0 | 1 | 0 |
| 0 | 0 | 0 | 1 | 0 | 0 | 0 | 0 | 1 | 1 | 0 | 1 | 0 | 0 | 0 |
| 0 | 1 | 0 | 0 | 0 | 1 | 0 | 1 | 1 | 1 | 0 | 0 | 1 | 1 | 1 |
| | | | 0 | 1 | 1 | 1 | 1 | 0 | 1 | 0 | 1 | 1 | 1 | |
| | | | 1 | 1 | 0 | 1 | 1 | 1 | 0 | 0 | 0 | 0 | 1 | |
| | | | 1 | 1 | 0 | 1 | 1 | 1 | 0 | 1 | 1 | 0 | 0 | |
| | | | 0 | 1 | 1 | 1 | 1 | 0 | 1 | 0 | 0 | 0 | 0 | |
| | | | 0 | 1 | 1 | 1 | 0 | 1 | 1 | 1 | 1 | 1 | 0 | |
| | | | 1 | 0 | 0 | 1 | 1 | 1 | 1 | 0 | 0 | 1 | 1 | |
| | | | 0 | 1 | 1 | 0 | 1 | 1 | 1 | 0 | 1 | 0 | 1 | |
| | | | 1 | 1 | 1 | 0 | 0 | 1 | 0 | 1 | 0 | 0 | 1 | | and;
   a transmitter configured to transmit the at least one training sequence.

2. The device of claim 1, wherein the training sequence repository includes all of the training sequences from the set of training sequences.

3. The device of claim 1, wherein the training sequence repository includes at least one second training sequence from a second set of training sequences consisting of

| Training Sequence |
|---|
| 0 0 1 0 0 1 0 1 1 1 0 0 0 0 1 0 0 0 1 0 0 1 0 1 1 1 |
| 0 0 1 0 1 1 0 1 1 1 0 1 1 1 1 0 0 0 1 0 1 1 0 1 1 1 |
| 0 1 0 0 0 0 1 1 1 0 1 1 1 0 1 0 0 1 0 0 0 0 1 1 1 0 |
| 0 1 0 0 0 1 1 1 1 0 1 1 0 1 0 0 0 1 0 0 0 1 1 1 1 0 |
| 0 0 0 1 1 0 1 0 1 1 1 0 0 0 1 0 0 0 0 1 1 0 1 0 1 1 |
| 0 1 0 0 1 1 1 0 1 0 1 0 0 0 0 0 1 0 0 1 1 1 0 1 0 |
| 1 0 1 0 0 1 1 1 1 1 0 1 1 0 0 0 1 0 1 0 0 1 1 1 1 1 |
| 1 1 1 0 1 1 1 1 0 0 0 1 0 0 1 0 1 1 1 0 1 1 1 1 0 0. |

4. The device of claim 1, wherein each training sequence in the set of training sequences is associated with a training sequence code (TSC):

| TSC | Training Sequence |
|---|---|
| 0 | 0 1 1 0 0 0 1 0 0 0 1 0 0 1 0 0 1 1 1 1 0 1 0 1 1 1 |
| 1 | 0 1 0 1 1 1 1 0 1 0 0 1 1 0 1 1 1 0 1 1 1 0 0 0 0 1 |
| 2 | 0 1 0 0 0 0 0 1 0 1 1 0 0 0 1 1 1 0 1 1 1 0 1 1 0 0 |
| 3 | 0 0 1 0 1 1 0 1 1 1 1 0 1 1 1 0 0 1 1 1 1 0 1 0 0 0 0 |
| 4 | 0 1 1 1 0 1 0 0 1 1 1 1 0 1 0 0 1 1 1 0 1 1 1 1 1 0 |
| 5 | 0 1 0 0 0 0 0 1 0 0 1 1 0 1 0 1 0 0 1 1 1 1 0 0 1 1 |
| 6 | 0 0 0 1 0 0 0 0 1 1 0 1 0 0 0 0 1 1 0 1 1 1 0 1 0 1 |
| 7 | 0 1 0 0 0 1 0 1 1 1 0 0 1 1 1 1 1 1 0 0 1 0 1 0 0 1. |

5. The device of claim 1, wherein the at least one training sequence was assigned to the device.

6. The device of claim 1, wherein the device is a base station.

7. The device of claim 1, wherein the device is a mobile station.

8. The device of claim 7, wherein the mobile station is multi-user aware.

9. The device of claim 1, wherein the training sequence is transmitted on a timeslot for multiple users.

10. The device of claim 1, wherein the device comprises a receiver configured to use the at least one training sequence.

11. A method in a mobile station comprising:
   transmitting a training sequence, wherein the training sequence is contained in a training sequence repository on the mobile station and is from a set of training sequences consisting of:

| Training Sequence |
|---|
| 0 1 1 0 0 0 1 0 0 0 1 0 0 1 0 0 1 1 1 1 0 1 0 1 1 1 |
| 0 1 0 1 1 1 1 0 1 0 0 1 1 0 1 1 1 0 1 1 1 0 0 0 0 1 |
| 0 1 0 0 0 0 0 1 0 1 1 0 0 0 1 1 1 0 1 1 1 0 1 1 0 0 |
| 0 0 1 0 1 1 0 1 1 1 1 0 1 1 1 0 0 1 1 1 1 0 1 0 0 0 0 |
| 0 1 1 1 0 1 0 0 1 1 1 1 0 1 0 0 1 1 1 0 1 1 1 1 1 0 |
| 0 1 0 0 0 0 0 1 0 0 1 1 0 1 0 1 0 0 1 1 1 1 0 0 1 1 |
| 0 0 0 1 0 0 0 0 1 1 0 1 0 0 0 0 1 1 0 1 1 1 0 1 0 1 |
| 0 1 0 0 0 1 0 1 1 1 0 0 1 1 1 1 1 1 0 0 1 0 1 0 0 1. |

12. The method of claim 11, further comprising receiving an assignment to use the training sequence.

13. The method of claim 11, wherein the training sequence is transmitted on a timeslot for multiple users.

14. The method of claim 11, further comprising receiving the training sequence on a timeslot for multiple users.

15. A transmitter comprising:
   a signal generator configured to generate a signal using a carrier frequency and timeslots, with at least some timeslots containing content for multiple receivers, the content for each receiver and each timeslot comprising at least a respective training sequence; and
   a training sequence repository configured with at least one training sequence from a first set of training sequences consisting of:

| Training Sequence | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 | 1 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 |  |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 0 | 0 | 1 | 0 | 1 | 0 | 0 | 1 | . |

16. The transmitter of claim 15, wherein:
the signal generated by the signal generator being such that for at least some of the timeslots containing content for multiple receivers, the respective training sequence for at least one of the multiple receivers comprises a first training sequence from the first set of training sequences.

17. The transmitter of claim 16, wherein the signal generated by the signal generator is such that for said at least some of the timeslots containing content for multiple receivers, the respective training sequence for at least one of the multiple receivers comprises a second training sequence from a second set of training sequences consisting of:

| Training Sequence | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 0 | 1 | 0 | 0 | 1 | 0 | 1 | 1 | 1 | 0 | 0 | 0 | 1 | 0 | 0 | 0 | 1 | 0 | 0 | 1 | 0 | 1 | 1 | 1 |  |
| 0 | 0 | 1 | 0 | 1 | 1 | 0 | 1 | 1 | 1 | 0 | 1 | 1 | 1 | 1 | 0 | 0 | 0 | 1 | 0 | 1 | 1 | 0 | 1 | 1 | 1 |
| 0 | 1 | 0 | 0 | 0 | 0 | 1 | 1 | 1 | 0 | 1 | 1 | 0 | 1 | 0 | 0 | 1 | 0 | 0 | 0 | 0 | 1 | 1 | 1 | 1 | 0 |
| 0 | 1 | 0 | 0 | 0 | 1 | 1 | 1 | 1 | 0 | 1 | 1 | 0 | 1 | 0 | 0 | 0 | 1 | 0 | 0 | 0 | 1 | 1 | 1 | 1 | 0 |
| 0 | 0 | 0 | 1 | 1 | 0 | 1 | 0 | 1 | 1 | 0 | 0 | 1 | 0 | 0 | 0 | 0 | 0 | 1 | 1 | 0 | 1 | 0 | 1 | 1 |  |
| 0 | 1 | 0 | 0 | 1 | 1 | 1 | 0 | 1 | 0 | 1 | 1 | 0 | 0 | 0 | 0 | 1 | 0 | 0 | 1 | 1 | 1 | 0 | 1 | 0 |  |
| 1 | 0 | 1 | 0 | 0 | 1 | 1 | 1 | 1 | 1 | 0 | 1 | 1 | 0 | 0 | 0 | 1 | 0 | 1 | 0 | 0 | 1 | 1 | 1 | 1 | 1 |
| 1 | 1 | 1 | 0 | 1 | 1 | 1 | 1 | 0 | 0 | 0 | 1 | 0 | 0 | 1 | 0 | 1 | 1 | 1 | 0 | 1 | 1 | 1 | 1 | 0 | 0 . |

18. The transmitter of claim 17 wherein for said at least some of the timeslots containing content for multiple receivers, the second training sequence is the sequence of the second set of training sequences that is best-paired with the first training sequence.

19. A method comprising:
for a timeslot on a carrier frequency which is to contain a multi-user signal, generating a multi-user signal by combining a respective training sequence for each receiver of at least two receivers and a respective payload for each receiver, wherein the respective training sequence for at least one of the multiple receivers comprises a first training sequence from a first set of training sequences consisting of:

| Training Sequence | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 | 1 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 |  |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 0 | 0 | 1 | 0 | 1 | 0 | 0 | 1 | ; | and transmitting the multi-user signal.

20. The method of claim 19, wherein the respective training sequence for at least one of the multiple receivers comprises a second training sequence from a second set of training sequences consisting of:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 0 | 1 | 0 | 0 | 1 | 0 | 1 | 1 | 1 | 0 | 0 | 0 | 0 | 1 | 0 | 0 | 0 | 1 | 0 | 0 | 1 | 0 | 1 | 1 | 1 |
| 0 | 0 | 1 | 0 | 1 | 1 | 0 | 1 | 1 | 1 | 0 | 1 | 1 | 1 | 1 | 0 | 0 | 0 | 1 | 0 | 1 | 1 | 0 | 1 | 1 | 1 |
| 0 | 1 | 0 | 0 | 0 | 0 | 1 | 1 | 1 | 0 | 1 | 1 | 1 | 0 | 1 | 0 | 0 | 1 | 0 | 0 | 0 | 0 | 1 | 1 | 1 | 0 |
| 0 | 1 | 0 | 0 | 0 | 1 | 1 | 1 | 1 | 0 | 1 | 1 | 0 | 1 | 0 | 0 | 0 | 1 | 0 | 0 | 0 | 1 | 1 | 1 | 1 | 0 |
| 0 | 0 | 0 | 1 | 1 | 0 | 1 | 0 | 1 | 1 | 1 | 0 | 0 | 1 | 0 | 0 | 0 | 0 | 0 | 1 | 1 | 0 | 1 | 0 | 1 | 1 |
| 0 | 1 | 0 | 0 | 1 | 1 | 1 | 0 | 1 | 0 | 1 | 1 | 0 | 0 | 0 | 0 | 1 | 0 | 0 | 1 | 1 | 1 | 0 | 1 | 0 |   |
| 1 | 0 | 1 | 0 | 0 | 1 | 1 | 1 | 1 | 1 | 0 | 1 | 1 | 0 | 0 | 0 | 1 | 0 | 1 | 0 | 0 | 1 | 1 | 1 | 1 | 1 |
| 1 | 1 | 1 | 0 | 1 | 1 | 1 | 1 | 0 | 0 | 0 | 1 | 0 | 0 | 1 | 0 | 1 | 1 | 1 | 0 | 1 | 1 | 1 | 1 | 0 | 0. |

21. The method of claim 20, wherein the second training sequence is the training sequence of the second set of training sequences that is best-paired with the first training sequence.

22. The method of claim 20 applied to generate a two-user signal, the method further comprising:
when a first multi-user aware receiver is to share with a second receiver:
a) assigning the first training sequence to the first receiver; and
b) assigning to the second receiver the second training sequence.

23. The method of claim 22 further comprising:
when a first multi-user unaware receiver is to share with a second receiver that is multi-user aware:
a) assigning the second training sequence to the first receiver; and
b) assigning the first training sequence to the second receiver.

24. The method of claim 19 further comprising:
assigning a training sequence of the first set by transmitting an assignment that assigns a training sequence from the first set.

25. The method of claim 19 further comprising:
assigning a training sequence of the first set by transmitting an assignment that assigns a training sequence from the first set; and
assigning a training sequence of the second set by transmitting an assignment that assigns a training sequence from the second set.

26. A receiver comprising:
at least one antenna;
wherein the receiver includes a training sequence repository configured with at least one training sequence from a first set of training sequences consisting of:

| Training Sequence | | | | | | | | | | | | | | | | | | | | | | | | |
|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 1 | 1 | 0 | 0 | 0 | 1 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 |   |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1 | and the training sequence repository is configured with at least one training sequence of a second set of training sequences consisting of:

| Training Sequence | | | | | | | | | | | | | | | | | | | | | | | | |
|---|---|---|---|---|---|---|---|---|---|---|---|---|---|---|---|---|---|---|---|---|---|---|---|---|
| 0 | 0 | 1 | 0 | 0 | 1 | 0 | 1 | 1 | 1 | 0 | 0 | 0 | 0 | 1 | 0 | 0 | 0 | 1 | 0 | 0 | 1 | 0 | 1 | 1 | 1 |
| 0 | 0 | 1 | 0 | 1 | 1 | 0 | 1 | 1 | 1 | 0 | 1 | 1 | 1 | 1 | 0 | 0 | 0 | 1 | 0 | 1 | 1 | 0 | 1 | 1 | 1 |
| 0 | 1 | 0 | 0 | 0 | 0 | 1 | 1 | 1 | 0 | 1 | 1 | 1 | 0 | 1 | 0 | 0 | 1 | 0 | 0 | 0 | 0 | 1 | 1 | 1 | 0 |
| 0 | 1 | 0 | 0 | 0 | 1 | 1 | 1 | 1 | 0 | 1 | 1 | 0 | 1 | 0 | 0 | 0 | 1 | 0 | 0 | 0 | 1 | 1 | 1 | 1 | 0 |
| 0 | 0 | 0 | 1 | 1 | 0 | 1 | 0 | 1 | 1 | 1 | 0 | 0 | 1 | 0 | 0 | 0 | 0 | 0 | 1 | 1 | 0 | 1 | 0 | 1 | 1 |
| 0 | 1 | 0 | 0 | 1 | 1 | 1 | 0 | 1 | 0 | 1 | 1 | 0 | 0 | 0 | 0 | 1 | 0 | 0 | 1 | 1 | 1 | 0 | 1 | 0 |   |
| 1 | 0 | 1 | 0 | 0 | 1 | 1 | 1 | 1 | 1 | 0 | 1 | 1 | 0 | 0 | 0 | 1 | 0 | 1 | 0 | 0 | 1 | 1 | 1 | 1 | 1 |
| 1 | 1 | 1 | 0 | 1 | 1 | 1 | 1 | 0 | 0 | 0 | 1 | 0 | 0 | 1 | 0 | 1 | 1 | 1 | 0 | 1 | 1 | 1 | 1 | 0 | 0 | and further wherein the receiver is configured to operate using a training sequence selected from one of the at least one training sequence from the first set of training sequences and the at least one training sequence from the second set of training sequences.

27. A mobile device comprising the receiver of claim 26.

28. The mobile device of claim 27, wherein the training sequence repository is configured with all training sequences of the first set.

29. The mobile device of claim 27 further configured to receive an assignment of a different training sequence as the mobile station moves.

30. A base station comprising the receiver of claim 26.

31. A method for a mobile device comprising:
 receiving an assignment that assigns a training sequence from a first set of training sequences consisting of

| Training Sequence | | | | | | | | | | | | | | | | | | | | | | | | | | |
|---|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 0 | 1 | 1 | 1 | 1 | 1 | 1 | 0 | 0 | 1 | 0 | 1 | 0 | 0 | 1; | and
 operating using the training sequence.

32. The method of claim 31 wherein operating using the training sequence comprises transmitting the training sequence on a timeslot for multiple users.

33. The method of claim 32, wherein the timeslot for multiple users is a voice services over adaptive multi-user channels on one slot (VAMOS) timeslot.

\* \* \* \* \*

UNITED STATES PATENT AND TRADEMARK OFFICE
CERTIFICATE OF CORRECTION

PATENT NO. : 7,933,355 B2  
APPLICATION NO. : 12/542995  
DATED : April 26, 2011  
INVENTOR(S) : Yan Xin et al.

Page 1 of 4

It is certified that error appears in the above-identified patent and that said Letters Patent is hereby corrected as shown below:

On the Title Page, Item (54), in the Title, line 2, "SEQUENCE, TRANSMISSION" should read --SEQUENCE TRANSMISSION--.

In the drawings:
In FIG. 1, in the "GSM Timeslot" shown at the bottom of the figure (marked as element number "108"):
"GSM Time-Slot (Normal Burst)" should read
--GSM Timeslot (Normal Burst)--; and
"Time Slot 156.25 bits" should read --Timeslot 156.25 bits--.

In FIG. 10A, for the element number linked to the box representing the "Training Sequence Repository", "100" should read --200--.

In FIG. 10B, for the element numbers linked to the two boxes representing the "Training Sequence Repository", "100" should read --200--.

In FIG. 11A, for the element number linked to the box representing the "Training Sequence Repository", "100" should read --200--.

In FIG. 11B, for the element numbers linked to the two boxes representing the "Training Sequence Repository", "100" should read --200--.

In FIG. 12A, for the element numbers linked to the two boxes representing the "Training Sequence Repository", "100" should read --200--.

In FIG. 12B, for the element number linked to the box representing the "Training Sequence Repository", "100" should read --200--.

Signed and Sealed this
Twentieth Day of September, 2011

David J. Kappos
*Director of the United States Patent and Trademark Office*

CERTIFICATE OF CORRECTION (continued)
U.S. Pat. No. 7,933,355 B2

In column 1, line 2, "SEQUENCE, TRANSMISSION" should read --SEQUENCE TRANSMISSION--.

In column 2, line 56, "computer readable" should read --computer-readable--.

In column 2, line 59, "computer readable" should read --computer-readable--.

In column 2, line 62, "computer readable" should read --computer-readable--.

In column 3, line 9, "of transmitter" should read --of a transmitter--.

In column 3, lines 21-22, "computer implemented" should read --computer-implemented--.

In column 4, line 1, "cross correlations" should read --cross-correlations--.

In column 4, lines 8-9, "computer implemented" should read --computer-implemented--.

In column 4, lines 21-22, "computer readable" should read --computer-readable--.

In column 4, line 54, "time slots," should read --timeslots,--.

In column 4, line 55, "time slots" should read --timeslots--.

In column 9, line 7, " $\hat{h} = (S'S)^{-1} S' y.$ (2)" should read -- $\hat{h}^t = (S'S)^{-1} S' y.$ (2)--.

In column 10, line 35, "sequences." should read --sequence.--.

In column 10, lines 51-52, "Table 2 and 3" should read --Tables 2 and 3--.

In column 10, lines 63-64, "computer readable" should read --computer-readable--.

In column 10, line 66, "through set" should read --through a set--.

In column 11, line 3, "best paired" should read --best-paired--.

In column 11, line 6, "computer readable" should read --computer-readable--.

In column 11, line 65, "computer readable" should read --computer-readable--.

In column 11, line 66, "computer readable" should read --computer-readable--.

In column 12, lines 4-5, "set A 137." should read --set B 137.--.

In column 12, line 53, "procedure II-IV" should read --procedures II-IV--.

In column 12, line 63, "computer readable" should read --computer-readable--.

In column 12, line 64, "computer readable" should read --computer-readable--.

In column 13, line 49, "auto-correlation" should read --autocorrelation--.

In column 14, line 11, "computer readable" should read --computer-readable--.

In column 14, line 35, "autocorrelation are" should read --autocorrelations are--.

In column 15, line 46, "TSCs length" should read --TSC's length--.

In column 16, line 5, "above-described 'first method' is" should read --above-described "first method" is--.

In column 17, lines 11-12, "best paired" should read --best-paired--.

In column 18, line 8, "by first" should read --by the first--.

In column 18, line 10, "not;" should read --not.--.

In column 18, line 50, "changes training" should read --changes the training--.

In column 19, lines 12-13, "changes training" should read --changes the training--.

In column 19, lines 17-18, "repository 210 a target training sequence set and a new" should read --repository 200, a target training sequence set, and a new--.

In column 19, line 32, "repository 100" should read --repository 200--.

In column 19, line 50, "criterion" should read --criteria--.

In column 20, line 5, "best paired" should read --best-paired--.

In column 20, line 19, "repository 210" should read --repository 200--.

In column 20, line 33, "to use particular" should read --to use a particular--.

CERTIFICATE OF CORRECTION (continued)
U.S. Pat. No. 7,933,355 B2

In claim 1, column 20, line 50, Training Sequence Chart, should consist of a full-size chart:

| Training Sequence | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 1 | 0 | 0 | 0 | 1 | 0 | 0 | 0 | 1 | 0 | 0 | 1 | 0 | 0 | 1 | 1 | 1 | 1 | 0 | 1 | 0 | 1 | 1 | 1 |
| 0 | 1 | 0 | 1 | 1 | 1 | 1 | 0 | 1 | 0 | 0 | 1 | 1 | 0 | 1 | 1 | 1 | 0 | 1 | 1 | 1 | 0 | 0 | 0 | 0 | 1 |
| 0 | 1 | 0 | 0 | 0 | 0 | 0 | 1 | 0 | 1 | 1 | 0 | 0 | 0 | 1 | 1 | 1 | 0 | 1 | 1 | 1 | 0 | 1 | 1 | 0 | 0 |
| 0 | 0 | 1 | 0 | 1 | 1 | 0 | 1 | 1 | 1 | 0 | 1 | 1 | 1 | 0 | 0 | 1 | 1 | 1 | 1 | 0 | 1 | 0 | 0 | 0 | 0 |
| 0 | 1 | 1 | 1 | 0 | 1 | 0 | 0 | 1 | 1 | 1 | 1 | 0 | 1 | 0 | 0 | 1 | 1 | 1 | 0 | 1 | 1 | 1 | 1 | 1 | 0 |
| 0 | 1 | 0 | 0 | 0 | 0 | 0 | 1 | 0 | 0 | 1 | 1 | 0 | 1 | 0 | 1 | 0 | 0 | 1 | 1 | 1 | 1 | 0 | 0 | 1 | 1 |
| 0 | 0 | 0 | 1 | 0 | 0 | 0 | 0 | 1 | 1 | 0 | 1 | 0 | 0 | 0 | 0 | 1 | 1 | 0 | 1 | 1 | 1 | 0 | 1 | 0 | 1 |
| 0 | 1 | 0 | 0 | 0 | 1 | 0 | 1 | 1 | 1 | 0 | 1 | 1 | 1 | 1 | 1 | 1 | 1 | 0 | 0 | 1 | 0 | 1 | 0 | 0 | 1 |

In claim 3, column 21, line 9, "consisting of" should read --consisting of:--.

In claim 31, column 27, line 11, "consisting of" should read --consisting of:--.